US007146366B2

(12) United States Patent
Hinshaw et al.

(10) Patent No.: US 7,146,366 B2
(45) Date of Patent: Dec. 5, 2006

(54) DISTRIBUTED CONCURRENCY CONTROL USING SERIALIZATION ORDERING

(75) Inventors: Foster D. Hinshaw, Somerville, MA (US); Craig S. Harris, Acton, MA (US); Sunil K. Sarin, Newton, MA (US)

(73) Assignee: Netezza Corporation, Framingham, MA (US)

( * ) Notice: Subject to any disclaimer, the term of this patent is extended or adjusted under 35 U.S.C. 154(b) by 226 days.

(21) Appl. No.: 10/653,453

(22) Filed: Sep. 2, 2003

(65) Prior Publication Data

US 2004/0078379 A1    Apr. 22, 2004

Related U.S. Application Data

(60) Provisional application No. 60/410,733, filed on Sep. 13, 2002.

(51) Int. Cl.
*G06F 17/30*   (2006.01)
(52) U.S. Cl. .............................................. 707/8; 707/10
(58) Field of Classification Search .................... 707/8, 707/201, 10
See application file for complete search history.

(56) References Cited

U.S. PATENT DOCUMENTS

| 4,881,166 | A | * | 11/1989 | Thompson et al. ............ 707/8 |
| 5,212,788 | A |   | 5/1993  | Lomet et al. |
| 5,241,675 | A | * | 8/1993  | Sheth et al. .................... 707/8 |
| 5,280,619 | A | * | 1/1994  | Wang .......................... 710/200 |
| 5,504,900 | A |   | 4/1996  | Raz |
| 5,701,480 | A |   | 12/1997 | Raz |
| 5,832,484 | A | * | 11/1998 | Sankaran et al. .............. 707/8 |
| 5,864,851 | A | * | 1/1999  | Breitbart et al. ............... 707/8 |
| 5,920,857 | A | * | 7/1999  | Rishe et al. ................... 707/3 |
| 5,983,225 | A | * | 11/1999 | Anfindsen ..................... 707/8 |
| 5,999,931 | A |   | 12/1999 | Breitbart et al. |

FOREIGN PATENT DOCUMENTS

EP    0 457 473 A2   11/1991

OTHER PUBLICATIONS

Bernstein, P.A., et al., "Non-Locking Schedulers," In *Concurrency Control and Recovery in Database Systems*, (USA: Addison-Wesley Publishing Company), pp. 113-142 (1987).

(Continued)

*Primary Examiner*—Greta Robinson
(74) *Attorney, Agent, or Firm*—Hamilton, Brook, Smith & Reynolds, P.C.

(57) ABSTRACT

A mechanism controls concurrency among database transactions through the use of serial ordering relations. The ordering relations are computed dynamically in response to patterns of use. An embodiment of the present invention serializes a transaction that accesses a resource before a transaction that modifies the resource, even if the accessor starts after the modifier starts or commits after the modifier commits. A method of concurrency control for a database transaction in a distributed database system stores an intended use of a database system resource by the database transaction in a serialization graph. A serialization ordering is asserted between the database transaction and other database transactions based on the intended use of the database system resource by the database transaction. The serialization ordering is then communicated to a node in the distributed database system that needs to know the serialization ordering to perform concurrency control. Cycles in the serialization graph are detected based on the asserted serialization order and in order to break such cycles and ensure transaction serializability a database transaction is identified that is a member of a cycle in the serialization graph.

34 Claims, 22 Drawing Sheets

OTHER PUBLICATIONS

Bernstein, P.A., et al., "Two Phase Locking," In *Concurrency Control and Recovery in Database Systems*, (USA: Addison-Wesley Publishing Company), pp. 47-111 (1987).

Bernstein, P.A., et al., "Multiversion Concurrency Control," In *Concurrency Control and Recovery in Database Systems*, (USA: Addison-Wesley Publishing Company), pp. 143-166 (1987).

* cited by examiner

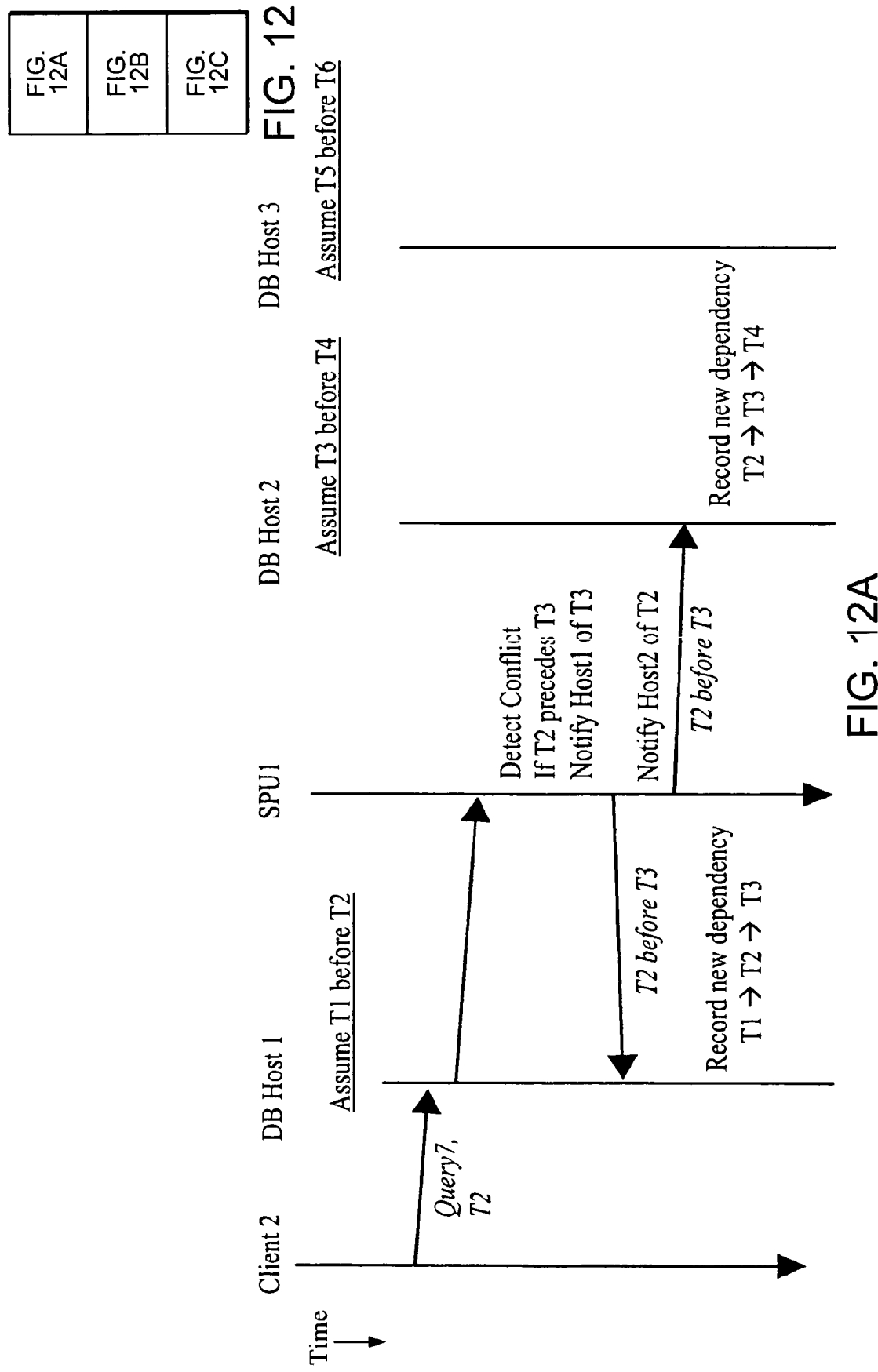

DISTRIBUTED CONCURRENCY CONTROL USING SERIALIZATION ORDERING

RELATED APPLICATION(S)

This application claims the benefit of U.S. Provisional Application No. 60/410,733, filed on Sep. 13, 2002. The entire teachings of the above application(s) are incorporated herein by reference.

BACKGROUND OF THE INVENTION

It is an object of a database system to allow many users to use the same information at the same time, while making it seem that each user has exclusive access to all information. The database system should provide this service with minimal loss of performance (latency) and maximal transaction throughput. The service is generally provided by concurrency control mechanisms, but these mechanisms have problems, including: coordinating conflicting access to shared resources in a distributed environment, ensuring serial ordering and preventing deadlocks in a distributed environment and reducing communication and other overhead required to achieve these ends.

A number of researchers have published taxonomies of concurrency control mechanisms (CCMs), to assist in classification and analysis. The general consensus divides CCMs at a high level into "pessimistic" concurrency control (PCC) and "optimistic" concurrency control (OCC).

Pessimistic schemes control concurrency by preventing invalid use of resources. When one transaction attempts to use a resource in a way that could possibly invalidate the way another transaction has used the resource, PCC schemes cause the requesting transaction to wait until the resource is available for use without potential conflict.

The advantage of PCC is that it reduces the chance that a transaction will have to start over from scratch. Two disadvantages of PCC are that (1) there is an increased chance of unnecessary waiting, and (2) there needs to be a mechanism to detect deadlocks, or cycles of transactions all waiting for each other. In general, PCC works best in environments with a higher likelihood of transaction conflict, and where it is more costly to restart transactions.

Optimistic schemes control concurrency by detecting invalid use after the fact. They optimize the case where conflict is rare. The basic idea is to divide a transaction's lifetime into three phases: read, validate and publish. During the read phase, a transaction acquires resources without regard to conflict or validity, but it maintains a record of the set of resources it has used (a ReadSet or RS) and the set of resources it has modified (a WriteSet or WS). During the validation phase, the OCC examines the RS of the transaction and decides whether the current state of those resources has since changed. If the RS has changed, then the optimistic assumptions of the transaction were proved to have been wrong, and the system aborts the transaction. Otherwise, the system publishes the WS, committing the transaction's changes.

The advantages of OCC schemes are that they (1) avoid having a writer wait for a reader in most cases, thereby improving latency and throughput, and (2) avoid the need to implement deadlock detection. The disadvantages are that (1) there is an increased chance of unnecessary restarts and of "starvation" (a condition where a transaction is continually restarted without making progress), (2) validation in a distributed environment is difficult and can lead to deadlocks, and (3) in order to validate a correct serializable order in a distributed environment, validation must occur in two phases—local then global—which slows things down considerably. In general, OCC works best in environments in which there are many more readers than writers, where the likelihood of conflict is low, and the cost of restarting transactions that do experience conflict is acceptable.

Within the general categories of PCC and OCC, there are several major implementation techniques, including: locking, time stamping, multi-versioning, and serialization graph algorithms.

The most common locking scheme is called "strict two phase locking" (2PL). In 2PL schemes, a transaction cannot access or use a resource unless it first acquires a lock. Acquiring a lock gives the transaction permission to use a resource in a given way, for a given period of time. If a transaction cannot acquire a lock, it must wait, or give up. Locks come in a variety of types, each lock granting permission for a different kind of use. Different types of locks may be compatible or incompatible as applied to the same resource. In general, two transactions can both acquire read locks on a given record, but cannot both acquire write locks on the same record. Lock-based schemes provide a conflict table, which clarifies which lock types are compatible. In strict 2PL schemes, transactions hold their locks until they complete. Releasing a lock before completion can improve throughput in some situations, but opens up the possibility of a cascaded abort (where a transaction that previously committed must be rolled back).

Lock-based schemes have a variety of disadvantages. First, every attempt to use a resource must first acquire a lock. Most of the time, these locks will prove to be unnecessary; yet acquiring them takes time and uses up memory. Second, in situations where information is cached or replicated at multiple points in a computationally distributed environment, it can be challenging to coordinate locking all the replicas. Third, in a distributed environment where information resources can be physically relocated during transactions, it can be difficult to coordinate accessing the information in its new location with the locks in its old location.

An alternative to lock-based mechanisms is called time stamping (TS). The idea is to serialize transactions in the order in which they start. Lock-based mechanisms build on a "wound wait" (WW) scheme. In TS/WW schemes, when an earlier transaction requests a resource held by a later transaction, the system "wounds" the later transaction, so that the earlier one can proceed. Conversely, when a later transaction requests a resource held by an earlier transaction, the system causes the later transaction to "wait" for the completion of the earlier transaction.

The advantages of TS/WW systems are that they (1) are deadlock-free, (2) avoid the overhead of lock acquisition, and (3) can make local decisions about concurrency control that will be as correct in a global distributed environment as they are in a local central environment. The disadvantages are that (1) by insisting on serializing in start order, they abort otherwise serializable transaction histories, reducing throughput and opening up the possibility of starvation, (2) they are subject to cascaded aborts (a major performance problem) when a later transaction commits before it can be wounded, (3) they have an additional disk space and I/O cost in having to stamp records with the start time of their writer, and (4) comparing time stamps in a distributed environment can be costly with unsynchronized clocks.

Multi-versioning concurrency control (MVCC) utilizes cloned copies of a requested resource. Different copies could be given to different transactions to resolve some types of resource conflicts without waiting. When a writer modifies a resource in MVCC, the system clones a new version of the resource and brands it as belonging to the writer. When a reader requests the same resource, it can be given an appropriate version of the resource. Many systems have built upon the original MVCC scheme. These variations fall roughly into two groups. One group tries to minimize the number of versions, in order to keep down disk storage and I/O requirements. Another group of variations tries to minimize conflicts (maximize throughput) by keeping as many versions as necessary to prevent conflicts.

In general, the advantages of MVCC schemes are that they (1) allow readers and writers to access the same resources concurrently, without waiting, in most cases, (2) avoid lock overhead much of the time, and (3) avoid the problems of cascaded aborts. The disadvantages are that they (1) require significantly more disk storage and I/O time, and (2) present challenges in efficiently selecting the appropriate version for a given request.

If transactions executed in serial order, concurrency conflicts would never occur. Each such transaction would be the only transaction executing on the system at a given time, and would have exclusive use of the system's resources. A new transaction would see the results of previous transactions, plus its own changes; and would never see the results of transactions that had not yet started. In the real world, transactions execute concurrently, accessing and modifying resources during the same periods of time. Yet sometimes, the concurrent execution of multiple transactions in real-world-time can be equivalent to a serial execution order in virtual-database-time.

Serialization graph algorithms (SGAs) control the concurrent operation of temporally overlapping transactions by computing an equivalent serial ordering. SGAs try to 'untangle' a convoluted sequence of operations by multiple transactions into a single cohesive thread of execution. SGAs function by creating a serialization graph. The nodes in the graph correspond to transactions in the system. The arcs of the graph correspond to equivalent serial ordering. As arcs are added to the graph, the algorithms look for cycles. If there are no cycles, then the transactions have an equivalent serial order and consistency is assured. If a serialization cycle were found, however, then consistency would be compromised if all transactions in the cycle were allowed to commit. In this case, the SGA would restore consistency by aborting one or more of the transactions forming the cycle.

SGAs can be combined with other mechanisms such as time stamps or multi-versioning (MV-SGA). MV-SGAs, in particular, have many advantages over traditional CCMs. Read-only transactions can operate without read locks and without ever being rolled back. Read-write conflicts can often be resolved without waits, by establishing ordering relationships. Some write-write conflicts, between "pure" writes that do not read the affected data resource (e.g., INSERTs into a relational database table) or between arithmetically commutative operations (e.g., addition/subtraction), can be avoided as well.

Thus, an effective technique for controlling concurrency and ensuring the serializability of data base transactions that does not excessively impede overall performance is needed.

SUMMARY OF THE INVENTION

The present invention provides a mechanism for controlling concurrency among database transactions through the use of serial ordering relations. The ordering relations are computed dynamically (i.e., during a transaction) in response to patterns of use across transactions. An embodiment of the present invention serializes a transaction that accesses a resource before a transaction that modifies the resource, even if the accessor starts after the modifier starts or commits after the modifier commits.

In distributed environments, consisting of multiple independent database nodes, serial ordering decisions are made at the locus of resource contention (i.e., at the node on which the resource resides). When decisions made locally could have an impact on global serialization, the node communicates ordering information to other nodes on a "need-to-know" basis. As an example, the node on which a transaction originates may need to know when that transaction becomes involved in a new serial ordering relationship.

The present invention provides a method of concurrency control for a database transaction in a distributed database system by storing an intended (or target) use of a database system resource by the database transaction in a serialization graph. A serialization graph is used to assert serialization ordering between the database transaction and other database transactions, based on the intended (target) use of the database system resource by the database transaction. The serialization ordering (as set forth in the local serialization graph) is then communicated to a node in the distributed database system that needs to know the serialization ordering to perform concurrency control and needs to update its serialization graph accordingly. Cycles in the serialization graph are detected based on the asserted serialization order and a database transaction is identified that is a member of a cycle in the serialization graph. Detection of cycles in the serialization graph may be deferred for a period of time.

In one embodiment, the serialization ordering is communicated from a first node, on which the serialization ordering was originally asserted, to a second node in the distributed database system. The second node is responsible for ensuring serializability of at least one of the database transactions participating in the serialization ordering. The second node may be selected according to a policy, for example a policy based on priority of transaction or resources involved, or based on node properties or other system attributes and criteria.

The present invention provides numerous benefits and advantages over prior art systems for concurrency control. By providing maximally localized decisions, the present invention minimizes communication overhead and improves performance. The present invention also provides better throughput than pure pessimistic schemes by avoiding most of the wait characteristics associated with pure pessimistic schemes. The present invention also avoids most of the aborts and wasted work of pure optimistic schemes. The dynamic serialization of the present invention (in both distributed and non-distributed database systems) also provides more flexibility and better throughput than static serialization. A single mechanism of the present invention supports multiple classes of resources at multiple granularities. Integration of SGA and 2PL mechanisms as provided in an embodiment of the present invention offers flexibility not found in pure MVCC SGA mechanism. The present invention also offers a single mechanism for both deadlock and cycle detection.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
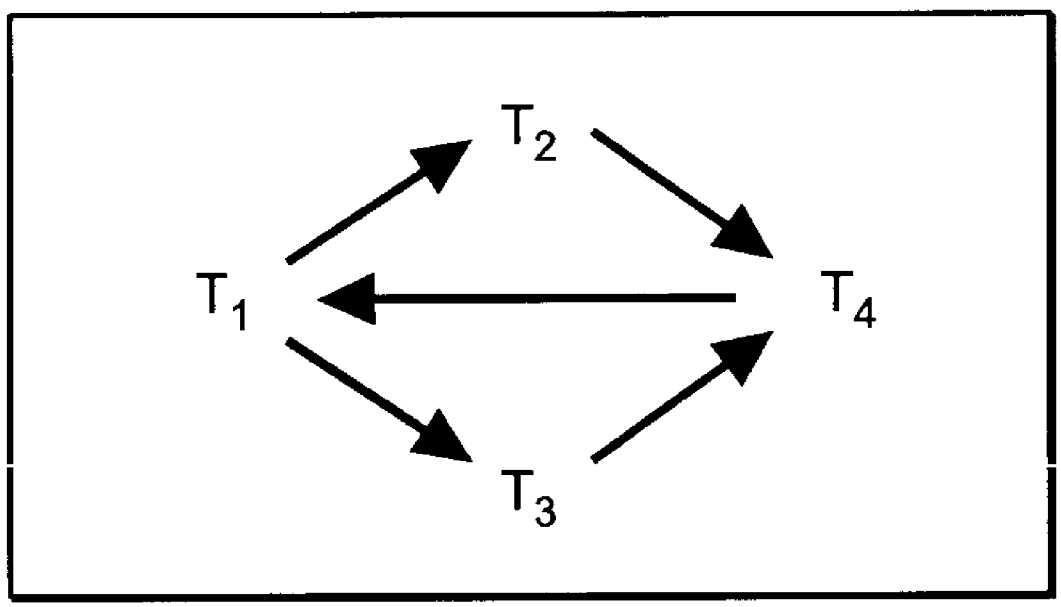
FIG. 1 is a serialization graph showing four example transactions.

A description of preferred embodiments of the invention follows. Efficiently assuring transaction serializability while avoiding deadlocks in a distributed environment is a significant problem for the concurrency control protocols of the prior art. Some approaches use a centralized "hub-and-spoke" scheme, in which a single computational entity makes all decisions. Other approaches use a federated scheme, in which global information affecting serialization is shared among all participants. Embodiments of the present invention use a distributed decision making process. It is neither fully centralized, nor fully federated. Instead, each element of a global decision is made locally. Information about serialization is then shared on a "need-to-know" basis.

The following examples show how embodiments of the present invention efficiently assure serializability in a distributed environment. These examples use some conventions to describe the temporal behavior of the system. The explanation of these conventions refer to the terms "DB-Host" and "Node", which are discussed in detail in the section on the components relevant to the invention.

$T_{subscript}$ is used to indicate a particular database transaction. The subscript has two components. The first component indicates the transaction id. The second indicates the host on which the transaction originates $T^{superscript}$ is used to indicate a particular operation. The superscript may have two components. The first is the action, such as starting, reading, writing or committing. The second is the resource being operated upon, such as record #1 on node #1.

$T_{1H1}^{S}$ means that Transaction $T_1$, originating on DB-Host #1, starts.

$T_{1H1}^{C}$ means that $T_1$, originating on DB-Host #1, commits.

$T_{1H1}^{A}$ means that $T_1$, originating on DB-Host #1, aborts.

$T_{1H1}^{R1N2}$ means that $T_1$, originating on DB-Host #1, reads Resource #1 on Node #2.

$T_{1H2}^{M1N3}$ means that $T_1$, originating on DB-Host #2, modifies Resource #1 on Node #3.

$T_{1H1}^{R1N2}$ ($T_{1H1} \rightarrow T_{2H1}$) means that, as a result of its action, $T_1$ is serialized before $T_2$.

When serialization cycles are formed through local interactions, cycle detection can occur locally:

$$T_{1H1}^{S}, T_{2H1}^{S}, T_{1H1}^{R1N1}, T_{2H1}^{M1N1} (T_{1H1} \rightarrow T_{2H1}),$$
$$T_{2H1}^{R2N1}, T_{1H1}^{M2N1} (T_{2H1} \rightarrow T_{1H1})$$

Here, $T_1$ starts on DB-Host #1. Then $T_2$ starts on DB-Host #1. Then $T_1$ reads Resource #1 on Node #1, where Node #1 is the same node as DB-Host #1. Then $T_2$ modifies Resource #1 on Node #1. At this point, the system serializes $T_2$ after $T_1$. This is because $T_1$ reads a value modified by $T_2$, but did not retrieve the modified version. This can only be equivalent to a serial ordering in which $T_1$ occurs in its entirety, followed by $T_2$ in its entirety; because if $T_2$ occurred first, then $T_1$ would have read the value produced by its modification of Resource #1. Next, $T_2$ reads a different Resource #2 on Node #1. Then $T_1$ modifies that resource. By similar logic, $T_2$ must serialize before $T_1$ here, because if $T_1$ came first, then $T_2$ would have read the value produced by $T_1$, and that did not happen.

At this point, a serialization cycle has formed. $T_1$ must precede $T_2$ based on the fourth step. But $T_1$ must follow $T_2$ based on the last step. This cycle would allow inconsistencies. So the system must abort one or both of the transactions.

Serialization cycles can also be formed remotely:

$$T_{1H1}^{S}, T_{2H1}^{S}, T_{1H1}^{R1N2}, T_{2H1}^{M1N2} (T_{1H1} \rightarrow T_{2H1}),$$
$$T_{2H1}^{R2N2}, T_{1H1}^{M2N2} (T_{2H1} \rightarrow T_{1H1})$$

This situation is almost identical to the one above, except that Node #2 and Node #3 are not the same as DB-Host #1. Based on the "need-to-know" rule, Node #2 and Node #3 will communicate the serialization edges above to DB-Host #1 (which is the originator of both transactions). DB-Host #1 will detect the serialization cycle, and one or both of the transactions will need to be aborted as discussed above.

Even though a transaction may have committed, it can still participate in a serialization cycle. Information about such transactions needs to be retained until it can be safely discarded, which is discussed below.

1. $T_{1H1}^{S}, T_{2H1}^{S}$,
2. $T_{1H1}^{R1N2}, T_{1H1}^{M2N2}, T_{2H1}^{R2N2}$ ($T2_{H1} \rightarrow T_{1H1}$),
3. $T_{1H1}^{C}$,
4. $T_{3H1}^{S}$ ($T_{1H1} \rightarrow T_{3H1}$),
5. $T_{2H1}^{M3N2}, T_{3H1}^{R3N2}$ ($T_{3H1} \rightarrow T_{2H1}$)

In Step 4, the system serializes $T_1$ before $T_3$ because $T_1$ committed before $T_3$ started.

At the end of Step 5, DB-Host #1 will detect the cycle $T_2 \rightarrow T_1 \rightarrow T_3 \rightarrow T_2$. In order to break this cycle and prevent inconsistencies, one of the active transactions in the cycle ($T_2$ or $T_3$) must be aborted ($T_1$ cannot be aborted, having already committed).

It is possible for a single serialization ordering between two transactions to simultaneously create multiple serialization cycles. A simple example of this involves four transactions with a history as shown below (see FIG. 1):

1. $T_{1H1}{}^S, T_{2H1}{}^S, T_{3H1}{}^S, T_{4H1}{}^S,$
2. $T_{1H1}{}^{R1N2}, T_{2H1}{}^{M1N2}$ ($T_{1H1} \rightarrow T_{2H1}$),
3. $T_{1H1}{}^{R2N2}, T_{3H1}{}^{M2N2}$ ($T_{1H1} \rightarrow T_{3H1}$),
4. $T_{2H1}{}^{R3N2}, T_{4H1}{}^{M3N2}$ ($T_{2H1} \rightarrow T_{4H1}$),
5. $T_{3H1}{}^{R4N2}, T_{4H1}{}^{M4N2}$ ($T_{3H1} \rightarrow T_{4H1}$),
6. $T_{4H1}{}^{R5N2}, T_{1H1}{}^{M5N2}$ ($T_{4H1} \rightarrow T_{1H1}$), After the final step, two cycles are created: ($T_1 \rightarrow T_2 \rightarrow T_4 \rightarrow T_1$ and $T_1 \rightarrow T_3 \rightarrow T_4 \rightarrow T_1$). In a similar way, it is possible to close three or more cycles simultaneously. In the example shown, both cycles involved three nodes. But it is possible for simultaneously created cycles to have different length perimeters.

If serialization cycles are always broken by aborting the transaction whose action would create the cycle, then it doesn't matter that multiple cycles may be formed simultaneously. If the system breaks a serialization cycle by selecting a transaction victim based on its age, its priority, or other factors, then the presence of multiple cycles can affect the operation of the invention. In the example above, if the system chose to abort $T_2$, it would still be left with the second cycle $T_1 \rightarrow T_3 \rightarrow T_4 \rightarrow T_1$.

It is possible for a serialization cycle to develop across three or more DB-Host nodes. A simple example of this involves three transactions with a history as shown below:

1. $T_{1H1}{}^S, T_{2H2}{}^S, T_{3H3}{}^S,$
2. $T_{1H1}{}^{R1N4}, T_{2H1}{}^{M1N4}$ ($T_{1H1} \rightarrow T_{2H2}$),
3. $T_{2H2}{}^{R2N5}, T_{3H1}{}^{M2N5}$ ($T_{2H2} \rightarrow T_{3H3}$),
4. $T_{3H3}{}^{R3N6}, T_{1H1}{}^{M3N6}$ ($T_{3H3} \rightarrow T_{1H1}$)

At the end of Step #2, the serialization information among the nodes is as follows:
  DB-Host #1: $T_1 \rightarrow T_2$
  DB-Host #2: $T_1 \rightarrow T_2$
  DB-Host #3: null At the end of Step #3, the serialization information among the nodes is:
  DB-Host #1: $T_1 \rightarrow T_2$
  DB-Host #2: $T_1 \rightarrow T_2 \rightarrow T_3$
  DB-Host #3: $T_2 \rightarrow T_3$ At the end of Step #4, the serialization information among the nodes is:
  DB-Host #1: $T_3 \rightarrow T_1 \rightarrow T_2$
  DB-Host #2: $T_1 \rightarrow T_2 \rightarrow T_3$
  DB-Host #3: $T_2 \rightarrow T_3 \rightarrow T_1$ Although it is clear that a cycle $T_1 \rightarrow T_2 \rightarrow T_3 \rightarrow T_1$ has formed after Step #4, the serialization information local to each DB-Host node is acyclic.

In order to detect cycles of this kind, it is important to follow the "need-to-know" rule on host nodes as well as on local nodes. After Step #3, on DB-Host #2, a new ordering relation has been transitively imposed. Looking at this closely:
  Before Step #3, DB-Host #2 had: $T_{1H1} \rightarrow T_{2H2}$
  After Step #3, DB-Host #2 had: $T_{1H1} \rightarrow T_{2H2} \rightarrow T_{3H3}$ By transitivity, Step #3 implicitly imposes the ordering relation $T_{1H1} \rightarrow T_{3H3}$. Neither $T_{1H1}$ nor $T_{3H3}$ are local to DB-Host #2. Therefore, the new ordering relationship between them must be sent to both DB-Host #1 and DB-Host #3, as they need to know about new ordering relationships affecting the transactions they originate. After this communication (between Step #3 and Step #4), the serialization information among the nodes is:
  DB-Host #1: $T_1 \rightarrow \{T_2, T_3\}$
  DB-Host #2: $T_1 \rightarrow T_2 \rightarrow T_3$
  DB-Host #3: $\{T_2, T_1\} \rightarrow T_3$ Then, after Step #4, the serialization information among the nodes is:
  DB-Host #1: $T_3 \rightarrow T_1 \rightarrow \{T_2, T_3\}$
  DB-Host #2: $T_1 \rightarrow T_2 \rightarrow T_3$
  DB-Host #3: $\{T_2, T_1\} \rightarrow T_3 \rightarrow T_1$ Both DB-Host #1 and DB-Host #3 could then detect the formation of a cycle.

The present invention provides asserting and communicating serial ordering of transactions, detecting conflicts for database system resources and identifying victims to resolve the conflicts. A method of concurrency control for a database transaction in a distributed database system comprises storing an intended use of a database system resource by the database transaction in a serialization graph. A serialization ordering between the database transaction and other database transactions is asserted based on the intended use of the database system resource by the database transaction. The serialization ordering is communicated to another node in the distributed database system that uses the serialization ordering to perform concurrency control on database transactions it manages. Cycles are detected in the serialization graph based on the asserted serialization order and a database transaction that is a member of a cycle in the serialization graph is identified. In this way, the present invention provides distributed concurrency control using serialization ordering.

The invention has several advantages over traditional approaches to concurrency control in a distributed environment. Some approaches to distributed concurrency control use a centralized "hub-and-spoke" scheme, in which a single computational entity makes all concurrency control decisions. This requires all other computational entities to transmit their concurrency-related information and wait for a 'verdict' on whether it is OK to proceed. If the single central decision maker becomes unavailable, then the whole system must wait to resolve questions of serialization. Another approach to distributed concurrency control uses a federated scheme, in which global information affecting serialization is shared among all participants. A federated system is more resilient to failure and delay. But it pays a price in higher communication costs and in having to control periods of time in which information is not uniformly distributed.

The present invention uses a distributed decision making process. Relative to a centralized "hub-and-spoke" scheme, the invention lowers the risk that a single failure will cripple the whole DBMS. Also, the present invention's ability to make decisions locally, where possible, reduces the amount of communication between the elements of the system, so that performance is better than in the centralized scheme. Relative to a federated scheme, the present invention's "need-to-know" approach reduces the amount of communication required, improving performance. The "need-to-know" approach also simplifies the challenge to a federated scheme in coordinating the uniform distribution of concurrency-related information.

Pessimistic Concurrency Control Mechanisms (PCCMs) control concurrency by avoiding conflict. When a transaction tries to use a resource in a way that could possibly cause inconsistency, PCCMs force it to wait until no conflict could possibly occur. Optimistic Concurrency Control Mechanisms (OCCMs) use resources as requested, without regard to concurrency control. When concurrency conflicts arise, OCCMs resolve the conflict by aborting transactions.

The present invention avoids most of the wait characteristic of PCCMs. It also avoids most of the aborts and wasted work of OCCMs. In environments that have occasional resource contention, but relatively infrequent serialization cycle or deadlock, the present invention provides higher throughput than either pure pessimistic or pure optimistic schemes.

Most MV-SGA schemes use a static criterion to decide serialization ordering. A common choice is to serialize based on transaction start order, using either a time stamp or a sequentially assigned identifier. Another common choice is to serialize based on commit order, so that transactions that commit earlier, serialized before those that commit later.

In one embodiment of the invention, serial ordering between transactions is assigned based on their dynamic patterns of use. Sometimes this will result in serializations that would be inadmissible in start-order or commit-order schemes. For example, consider the following transaction history:

$$T_1^{starts}, T_2^{starts}, T_2^{reads\ R1}, T_1^{modifies\ R1}, T_1^{commits},$$
$$T_2^{does\ a\ long\ computation}, T_2^{commits}$$

Here, $T_1$ starts before $T_2$. Approaches that always serialize based on start order would have a problem after the fourth step, $T_1^{modifies\ R1}$. If $T_2$ follows $T_1$ (because it starts after $T_1$), then when $T_2$ read R1 in the third step, it should have seen the result of $T_1$'s modification. But that modification had not occurred yet. So if a static start-order based mechanism insists that $T_2$ follows $T_1$, then it must abort one of the two transactions, so that either $T_2$ does not read an inconsistent value, or $T_1$ does not produce an inconsistent value.

In the history above, $T_1$ commits before $T_2$. Approaches that always serialize based on commit order would also have a problem after $T_1^{modifies\ R1}$. If $T_2$ follows $T_1$, then when it read R1, it should have seen the result of $T_1$'s modification. Since it did not, $T_1$ cannot be allowed to commit earlier than $T_2$. A commit-order-always based mechanism must either (a) abort one of the two transactions, or (b) cause $T_1$ to wait until $T_2$ completes. Of course, if $T_2$ takes a long time to commit, then $T_1$ will have to wait a long time before it can read R1.

In contrast, one embodiment of the present invention assigns serial ordering between transactions based on their dynamic patterns of use. In the history above, an embodiment of the present invention would decide that $T_1$ follows $T_2$ at the point that $T_1^{modifies\ R1}$, based on the principle that readers serialize before writers. By decoupling serialization order from either transaction start order or transaction commit order, the present invention is able to allow transaction histories like the one above, without waits or aborts.

Most databases offer the ability to control concurrency of multiple classes of resources at multiple levels of granularity. For example, relational databases frequently offer both record level locking and table level locking. Since records are part of tables in relational databases, locking a table may conflict with locking a record in the table. The total number of concurrency conflict situations that can arise in such systems is the product of the number of different types of usage locks on each different resource class and granularity. Concurrency control in these systems gets complex quickly. It is hard for users to understand. It is also hard for DBMS authors to extend their concurrency control mechanisms to cover additional classes and granularities of resources, as the number of possible interactions grows exponentially.

By focusing exclusively on serial ordering relations, the present invention provides a single mechanism for coordinating concurrency across resource classes and granularities.

As in traditional MVCC mechanisms, read-write conflicts can be resolved through serialization choices, so that resource users experience fewer aborts and less waiting. When two transactions both wish to access and modify the same resource, the system must either abort one transaction or force one to wait for the completion of the other. Whereas pure MVCC SGA mechanisms would abort one of the transactions in this case, the invention allows the possibility of resolving the conflict through waiting when the transactions operate with the Read Committed isolation level. The invention is able to offer this benefit through the integration of serialization ordering and two-phase locking.

The invention integrates SGA and 2PL mechanisms. Write-Write conflicts, for example, can be resolved by waiting on a lock. In addition to offering this flexibility, the invention provides a single mechanism for detecting both deadlocks and serialization cycles.

Figure 2:
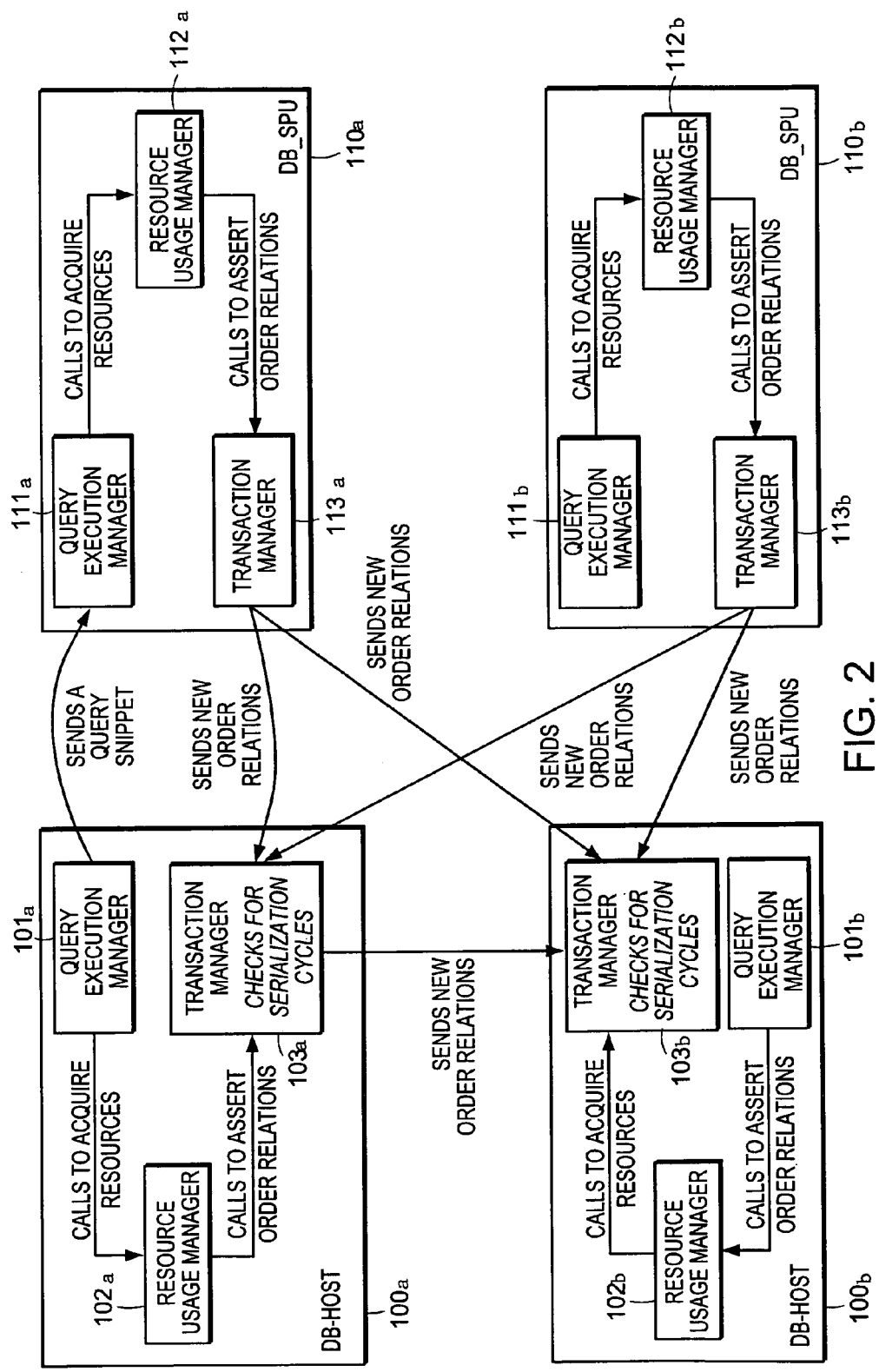
FIG. 2 is a block diagram of a distributed database system configured according to an embodiment of the present invention.

FIG. 2 is a block diagram of a distributed database system configured according to one embodiment of the present invention. A distributed database consists of many nodes, which may have different capabilities. A DB-Host 100a, b node is capable of originating new transactions. These transactions can execute queries, which may acquire resources that reside locally to the DB-Host or remotely on another node. The DB-Host 100a, b comprises three software components. The Query Execution Manager (QEMgr) component 101a, b is capable of dividing a query into snippets, some of which may be executed local to the DB-Host 100a, b, and some of which may be executed on remote nodes. A snippet is a piece of a query, which may contain one or more database operations. The Resource Usage Manager (RUMgr) component 102a, b is responsible for coordinating concurrent use of resources local to the DB-Host 100. The Transaction Manager (TxMgr) component 103a, b is responsible for transaction management functions, including starting, committing, aborting, and recovering transactions. In addition, the TxMgr is responsible for establishing a linear serialization order for all transactions (whether originating locally or remotely to the DB-Host 100a, b) that interact with those originating on the DB-Host 100.

A database snippet processing unit (DB-SPU) 110a, b node is capable of executing query snippets received from DB-Host 100a, b nodes. A DB-SPU 110a, b node need not be capable of originating new transactions. A DB-SPU 110a, b node comprises three software components. The Query Execution Manager (SpuQEMgr) component 111a, b is capable of receiving and processing a query snippet received from another node. The SpuQEMgr 111a, b may need to use local resources to process a query snippet, and coordinates the use of such resource by interacting with the Resource Usage Manager (SpuRUMgr) component 112a, b. The SpuRUMgr 112a, b keeps track of which transactions use which resources in which ways. When two transactions use the same resource, their use may impose a serial ordering on their execution. If so, the SpuRUMgr 112a, b communicates this ordering to the Transaction Manager (SpuTxMgr) component 113a, b. The SpuTxMgr 113a, b is responsible for maintaining a local view of the serial ordering relationship among transactions operating on the DB-SPU 110a, b node. If the SpuRUMgr 112a, b informs the SpuTxMgr 113a, b of a new serial ordering relationship between two transactions, and if one or both of those transactions originate on different nodes, then the SpuTxMgr 113a, b sends a message to the TxMgr 103a, b component on the nodes on which the newly ordered transactions originated.

Figure 2A:
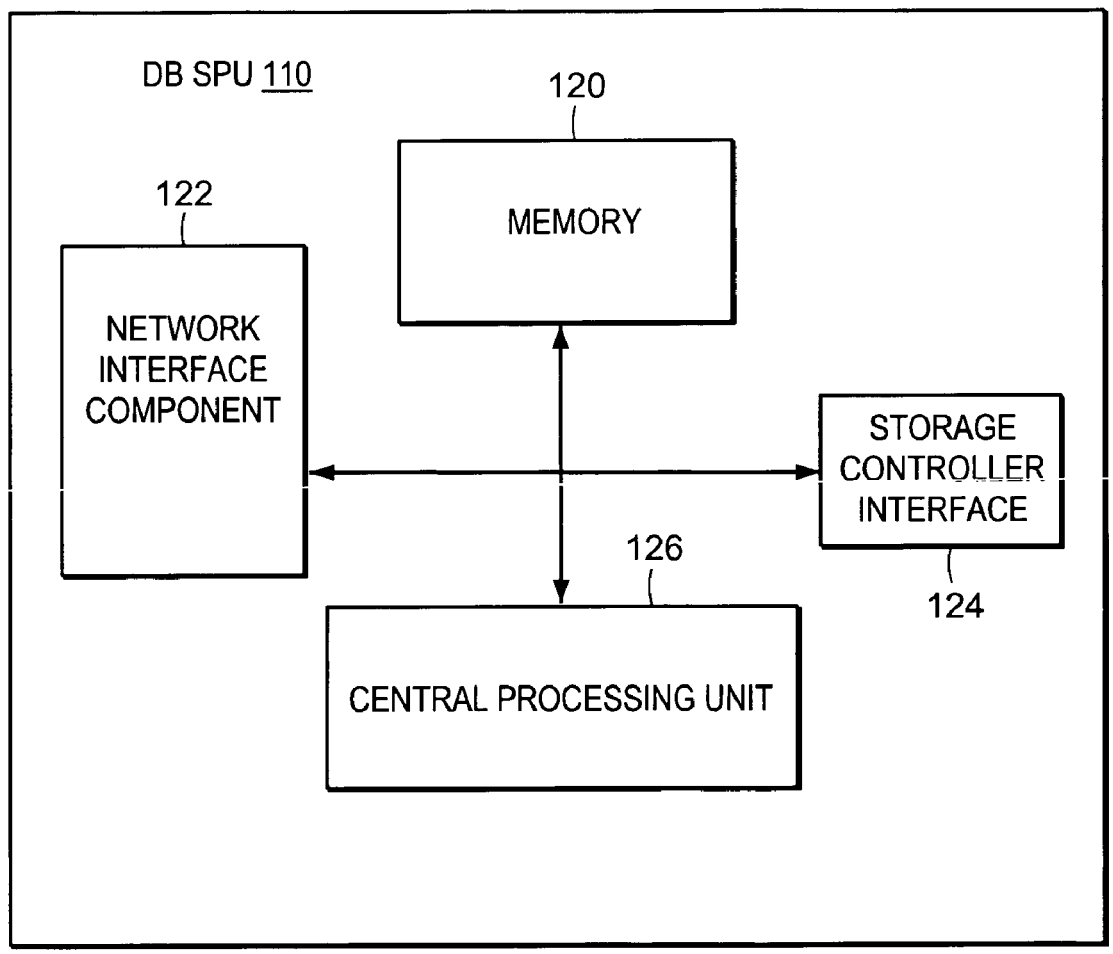
FIG. 2A is a block diagram of one of the nodes shown in FIG. 2

FIG. 2A is a block diagram of one of the DB-SPU 110a, b nodes shown in FIG. 2. The DB-SPU 110 includes a memory 120, a central processing unit 126, a network interface component 122 for coupling to a data communication network and a storage controller interface 124 (e.g., an IDE controller interface) for coupling to a storage controller (e.g., IDE disk drive controller).

Figure 3:
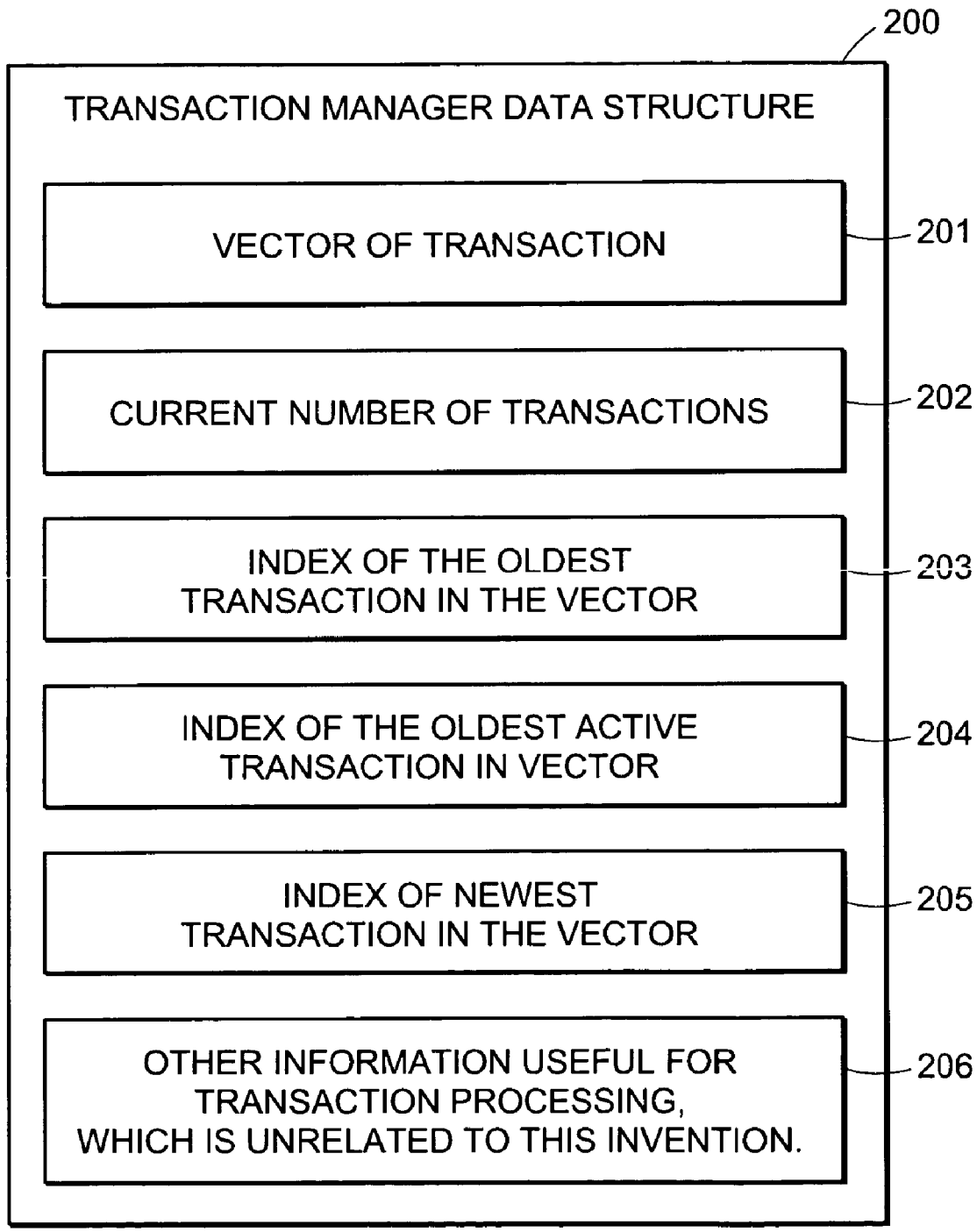
FIG. 3 is a block diagram of a Transaction Manager data structure.

FIG. 3 is a block diagram of a Transaction Manager data structure 200 used by the TxMgr 103a, b and SpuTxMgr 113a, b. The TxMgr data structure contains a Vector of Transactions (Vector) field 201, which is a sequence of transaction data structures 300 (FIG. 4), contiguous in memory. Individual transactions 300 can be referenced by their index within this Vector 201. The following four fields are associated with this Vector 201. The Current Number of Transactions in the Vector (curCount) field 202 keeps track of the number of transactions represented within the Vector 201. The size of the Vector 201 is typically larger than the curCount 202. The Index of the Oldest Transaction in the Vector (oldestIndex) field 203 points into the Vector 201 to the oldest transaction. At a given time, the oldest transaction on the system is not necessarily in the first slot in the Vector 201. The Index of the Oldest Active Transaction (oldestActive) field 204 points into the Vector 201 to the oldest active transaction.

The distinction between the oldest transaction and the oldest active transaction is subtle and important. In one embodiment of the present invention, information associated with a transaction "A" may need to be maintained after it commits, until the system is certain that no new serialization edges can be created that would lead to a cycle involving this transaction. This is the case when (i) there is no other active transaction that started before transaction "A" committed, and (ii) there is no other committed transaction that serializes (via a path of one or more serialization edges) before transaction "A". For this reason, the oldestActive field 204 may indicate a different transaction than the oldestIndex field 203. The Index of Newest Transaction in Vector (newestIndex) field 205 points to the most recent transaction 300. An embodiment of the invention uses the oldestIndex 203 and the newestIndex 205 to loop through every transaction 300 on the system. Finally, the TxMgr data structure 200 contains other information 206 useful for transaction processing, which is not necessarily utilized by the present invention.

Figure 4:
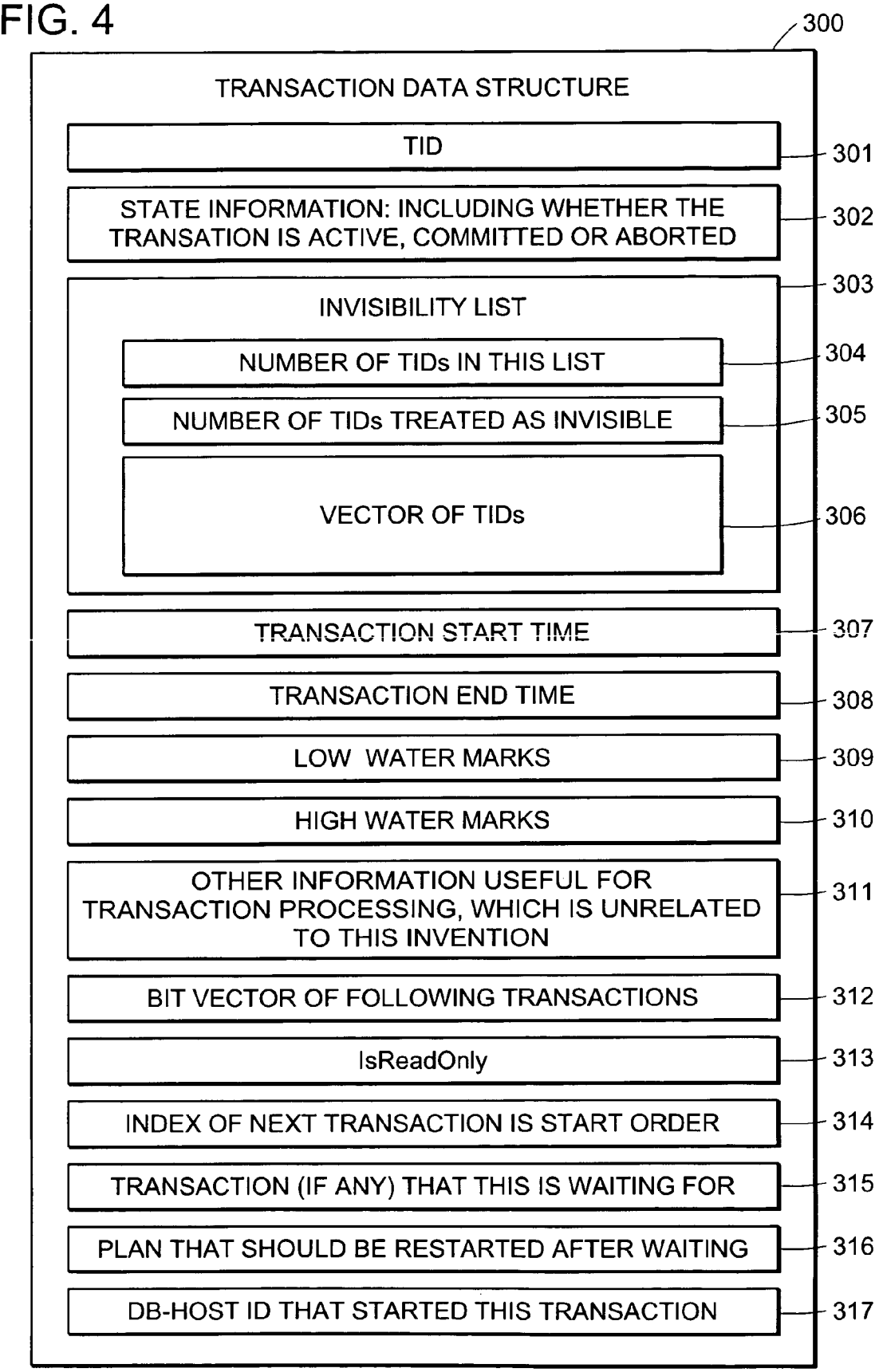
FIG. 4 is a block diagram of a Transaction data structure.

FIG. 4 is a block diagram of a Transaction data structure 300. The TID field 301 is a symbol that uniquely identifies a transaction throughout all time. The State Information (state) field 302 describes the state of the transaction 300, including whether it is active, waiting, committed, or aborted. The Transaction Start Time (startTime) field 307 and the Transaction End Time (endTime) field 308 are used in embodiments of the present invention to determine when the TxMgr 103 and the SpuTxMgr 113 can release the resources associated with a transaction 300. The rule in this regard is that a transaction 300 that commits as of a certain endTime 308 must retain its resources until there is no other active transaction 300 whose startTime 307 is less than that endTime 308.

The Bit Vector of Following Transactions (followers) field 312 maintains a record of which other transactions 300 follow the given transaction 300 in serialization order. Each bit position in the vector is interpreted as an index of another transaction within the TxMgr data structure's 200 Vector of Transactions 201. For example, if a transaction "A" had followers with a bit set in the third position, that would mean that transaction "A" precedes the transaction found at index 3 into the TxMgr data structure's 200 Vector of Transactions 201. The set of all transactions 300 and their followers 312 forms a serialization graph at each DB-Host 100 and DB-SPU 110 node in the system.

A "read-only transaction" is a transaction 300 that performs no update operations. As such, its resource use never conflicts with that of another transaction. The present invention avoids concurrency control processing and overhead for read-only transactions that require Repeatable Read isolation (or a weaker isolation level). For read-only transactions requiring Serializable isolation, resource usage and serialization ordering need to be tracked to ensure that the transaction sees a state consistent with the serialization ordering relationships among update transactions. The IsReadOnly field 313 keeps a record of whether a transaction 300 is a read-only transaction.

The Index of Next Transaction in Start Order (next) field 314 maintains a thread through the TxMgr data structure's 200 Vector of Transactions 201, sorted by startTime 307. This field is used to loop through all the transactions. Occasionally, transaction throughput can be improved by having one transaction wait for the completion of another transaction before acquiring a resource. The waitFor field 315 indicates the transaction 300 (if any) whose completion is required before a resource request can be honored. When one transaction waits for another, the TxMgr data structure 200 records in a field 316 the query plan that should be restarted after waiting. The TxMgr data structure also records in field 317 an indication (identifier) of the DB-Host 100 that started this transaction 300. When a new serialization ordering relationship is established between two transactions on a given node (100, 110), the TxMgr (103, 113) on that node communicates the new ordering information on a "need-to-know" basis.

Invisibility List 303 information (304, 305, 306) is used to control which version of a record is visible to a transaction at a given time. The Low Water Mark 309 and High Water Mark 310 are used to expedite rollback processing by marking the affected portions of the database file. The fields (303–306, 309, 310) are included for completeness, but are not essential to the operation of the present invention. Finally, there is other information 311 useful for transaction processing, which may not be used by the present invention.

Figure 5:
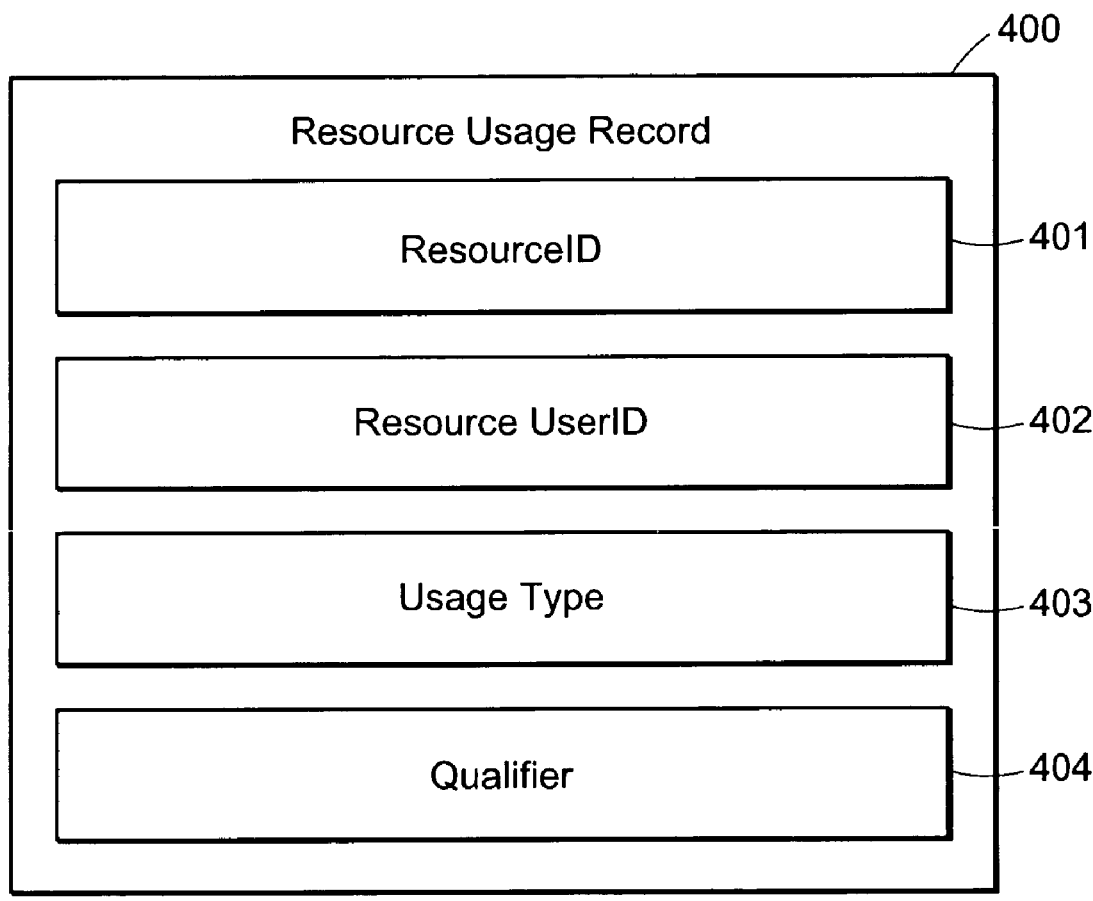
FIG. 5 is a block diagram of a Resource Usage Record data structure.

FIG. 5 is a block diagram of a Resource Usage Record data structure 400 that records the use of a resource. A Resource Usage Record data structure 400 contains four fields. The ResourceID 401 field identifies the resource used. If the resource is a record in the database, the ResourceID is a value that uniquely identifies the record. In a multi-versioning system with multiple versions of the same record, each version would have the same ResourceID. If the resource is a table in the database, the ResourceID is a value that uniquely identifies the table. In one embodiment of the present invention, a 64-bit quantity is used to identify resources, but any unique value may be used. The ResourceUserID 402 field uniquely identifies the transaction that uses the resource. The UsageType 403 field encapsulates the way in which the resource is used. The most common types of usage are reading and writing. Other usage types are possible as well, such as insert/create, add/subtract, and multiply/divide. The optional Qualifier 404 field, in the case of a table, identifies a subset of the records in the table by a predicate on the contents of the records. For an SQL query of the form "SELECT * from Employee WHERE Age>55", for example, the Qualifier 404 is a representation of the WHERE clause "Age>55". The Qualifier 404 is blank if no proper subset of the table can be identified (in which case the UsageType 403 is treated as applying to potentially all records of the table), or if the ResourceID 401 identifies an individual record.

Figure 6:
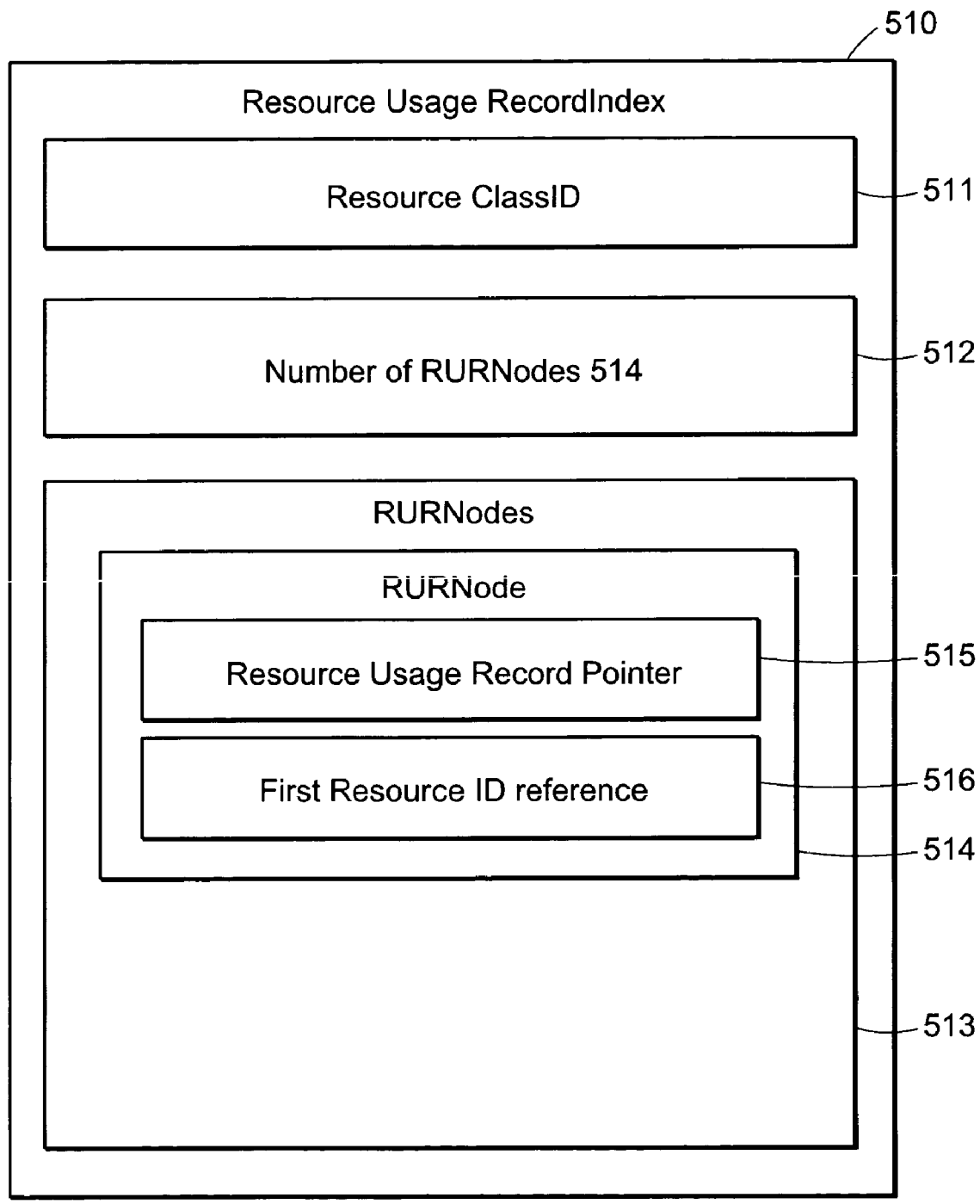
FIG. 6 is a block diagram of a Resource Usage Record Index data structure.

FIG. 6 is a block diagram of a Resource Usage Record Index data structure used to index records of resource use. A Resource Usage Record Index data structure 510 is used by the RUMgr 102 and the SpuRUMgr 112 to rapidly locate instances of Resource Usage Record data structures 400. It contains a Resource Class ID 511 that uniquely identifies a resource class. If the resource is a record belonging to a table, then the resource class could be the table. The Resource Usage Record Index data structure 510 also contains a sequence 513 of Resource Usage Record nodes (RURNode) 514. Each RURNode 514 contains two fields. The Resource Usage Record Pointer 515 field denotes a Resource Usage Record 400. The First Resource ID Referenced 516 field is used as a primary sort on the sequence 513 of RURNodes. Total number of RURNodes 514 in the sequence 513 is indicated in Number field 512.

Figure 7A:
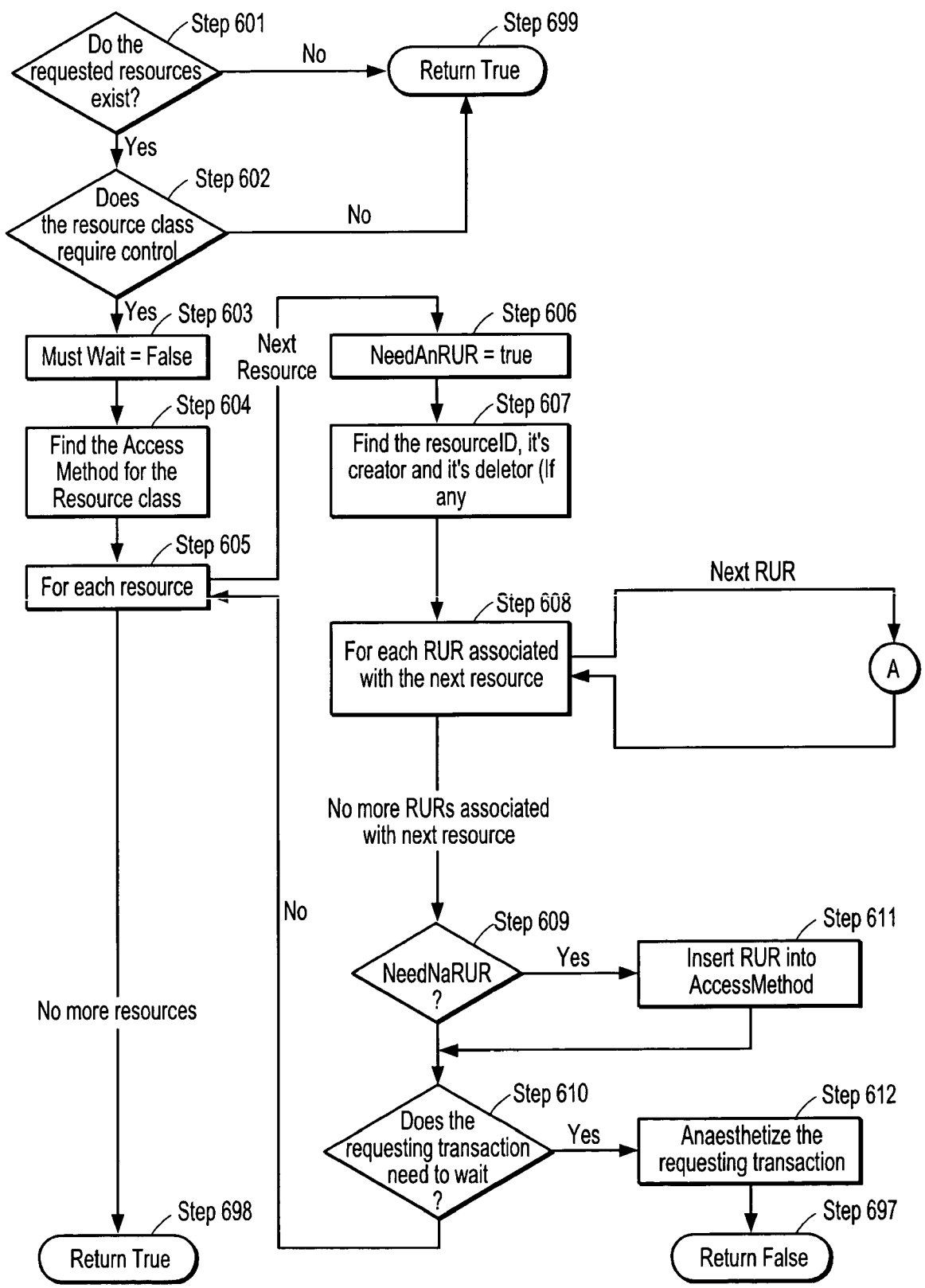
FIG. 7A and FIG. 7B are a flow chart of a procedure for resource acquisition.
Figure 7B:
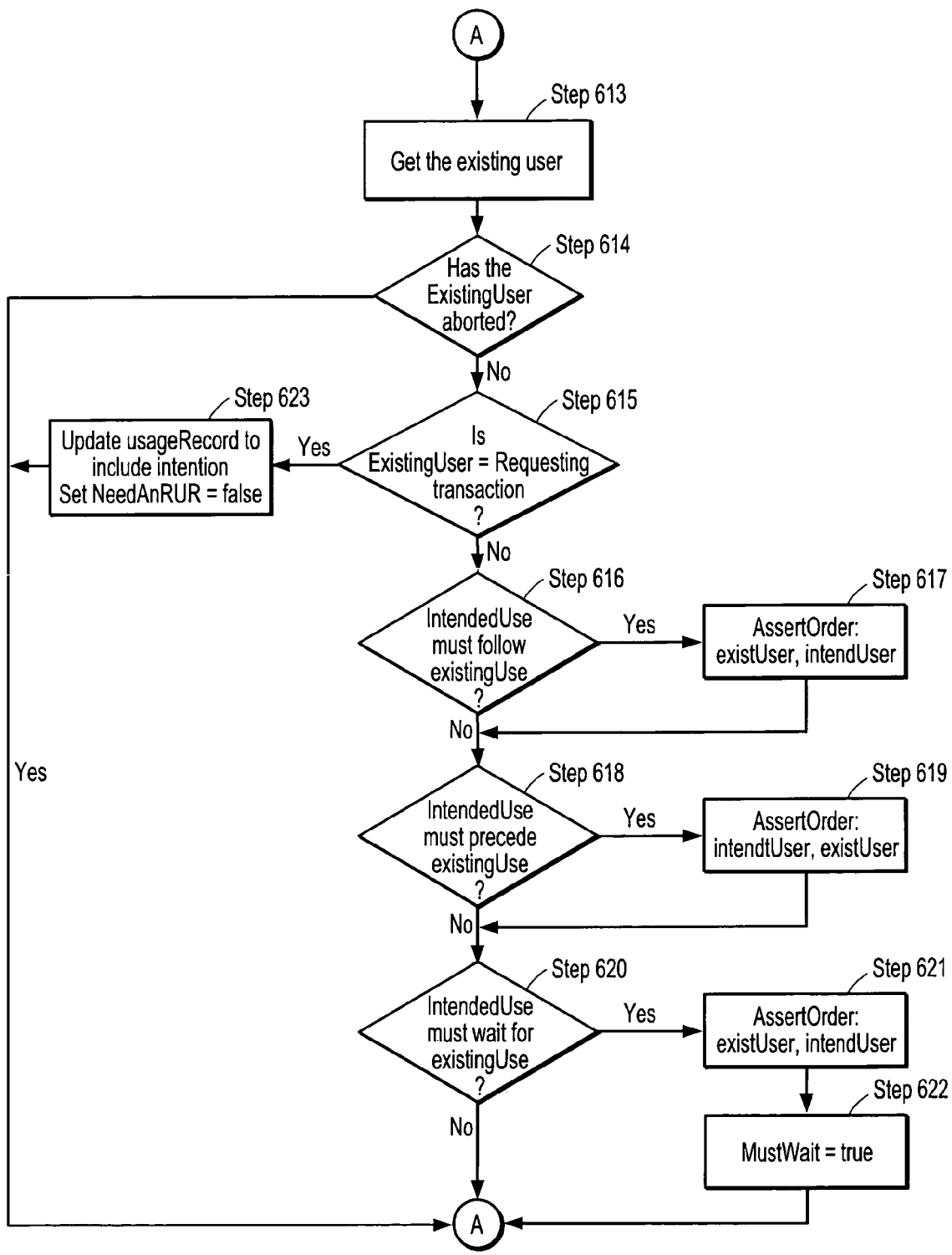

FIGS. 7A and 7B are a flow chart of a procedure for resource acquisition. The procedure for normal resource allocation takes three inputs: 1) a requesting transaction, 2) a requested set of resources of a given class and 3) intended use of the requested resources. The present invention controls concurrency by registering intended use with a node's RUMgr (102, 112). This serves a function that is similar to acquiring a lock in 2PL-based systems. However, unlike a lock, a Resource Usage Record 400 does not necessarily block access. It merely records an intended use of a resource. There may be several levels of resource usage, from those requiring the highest level of isolation, to those not requiring isolation at all. The levels are, in the order from highest to lowest: serializable, repeatable read, read committed, and dirty read (sometimes referred to as "read uncommitted).

The present invention allows several modes of resource acquisition. First, because resource acquisition of any type requires processing time and memory, it is recognized that several classes of use do not require checking at all. Transactions that are known to be read-only can never experience concurrency conflicts. Therefore, read-only transactions do not need to acquire their resources or create RURs when operating at the Repeatable Read isolation level or below. In rare circumstances, read-only transactions operating at the Serializable isolation level may need to be aborted to guarantee a consistent view. In SQL-92 conformant relational databases, there is a specific command to set a transaction to be read-only. In addition, any single SELECT statement outside the scope of an explicit transaction is also known to be read-only. Transactions that do nothing more than load new data (insert-only, no reading) can also avoid the expense of acquiring RURs. Any class of resource that is not shared does not require RURs. Examples of such resource classes are: (a) user-defined temporary tables; (b) tables that an optimizer/planner determines have a lifetime limited to a given transaction; and (c) temporary tables created by an optimizer/planner as intermediate results to be dropped no later than the end of the transaction.

The normal mode of acquisition is to record read or write intent on a resource of a given class, such as a record in a table, a whole table, or some other resource granularity such as a subset of the records in a table matching a qualifier predicate. Other modes of acquisition include reverse mode. The intent of reverse mode acquisition is to reduce the RUR overhead for environments with relatively few update transactions.

In order to control concurrent use of a resource, one embodiment of the present invention provides transactions an ability to acquire the right to use resources in particular ways. Acquiring rights involves several steps: 1) checking to see if other transactions are using the same resource(s) in conflicting ways, 2) potentially waiting until the requestor can acquire the right to use the resource(s), 3) establishing serial ordering relationships in order to resolve conflicts and 4) leaving a record of the intended use, to help resolve future conflicts.

As introduced above, the procedure for acquiring rights takes three inputs: 1) the requesting transaction, 2) the resources being requested and 3) the intended use of those resources. The resources may be records in a table, tables in the database, or any other resource. The intended use may be the intention to retrieve the resources (read), to modify the resources (write), or any other intended use.

The procedure returns when the requesting transaction has the right to use the specified resources in the specified way. It takes a cautiously optimistic approach in making this determination. If it can determine locally that the requestor must wait to acquire the right to use, then it does not return until the right can be granted. If it cannot make a local determination, it conditionally grants the caller the right to use the resources, but it may later revoke the right and abort the transaction.

The process begins at Step 601 where a check is made to see whether the intended resources actually exist. If not, then the requestor is given the right to use them by returning true (Step 699). Step 602 checks to see whether the intended use requires concurrency control or not. If not, then the requester is given the right to use the resources by returning true (Step 699). A read-only transaction, for example, would not require any special checking to acquire the right to read a record.

After the quick checks mentioned above (Steps 601, 602), the procedure sets a variable to indicate that it is not necessary to wait to acquire the resources (Step 603). This variable may be reset later on. It is checked at the end to see whether the requester must wait. Next, the procedure, at Step 604, locates the access method for the specified class of resources. The access method is used to rapidly locate any existing RURs that may match the input list of resources.

The procedure then loops over each requested resource (Step 605). For each requested resource, the procedure sets a variable indicating a NeedAnRUR to true (Step 606) and uses the access method to find all RURs involving that resource at Step 607. For each such RUR (Step 608), the procedure performs a series of tests after getting the existing user at Step 613 (FIG. 7B). At Step 614, if the existing user (the TID in the next RUR) has aborted, the procedure continues examining the next RUR applying to the given resource. At Step 615, if the existing user is the same as the requester, then the requestor has already acquired the right to use the resource. If the intended uses are the same (step 623), the procedure can return immediately. If the intended use is more restrictive than the previous use, for example, if the current request is to write a record while the previous request was to read the same record, then (a) remember that we may need to upgrade the use on the existing RUR, and (b) continue checking. If the intended use must follow the existing use (Step 616), then call the procedure AssertOrder (Step 617) to assert that the requestor must follow the transaction indicated in the RUR. This case would occur if the request were to modify a record that had been read by another transaction.

If the intended use must precede the existing use (Step 618), then call the procedure AssertOrder (Step 619) to assert that the requestor must precede the transaction indicated in the RUR. This case would occur if the request were to read a record that had been modified by another transaction.

The procedure determines if the intended use must wait (Step 620) for any of the existing uses. This would be the case, for example, if the intention was to modify a record that was already modified by another transaction, assuming that the requester operated at either the Read Committed or Repeatable Read isolation level. In this case, the procedure AssertOrder is called (Step 621) to assert that the requester must follow the transaction indicated in the RUR. Then, modify the requester transaction to indicate that it is waiting for the completion of the transaction identified by the RUR (Step 622).

Each RUR for a given resource is processed as above, each beginning with looping back to Step 608.

After examining all RURs for the given resource, if the requestor already had an RUR (Step 609) and if the current intended use is more restrictive, then the procedure upgrades the intended use of the existing RUR to the current intended use. For example, if the existing RUR's intended use was the right to read a record and if the current intended use is the right to write the record, then the procedure updates the existing RUR's intended use from read to write.

After examining all RURs for the given resource, if the requestor did not already have an RUR, then the procedure creates an RUR (611) to describe the intended use of the given resource. The procedure then adds the RUR into the access method, so that it can be found by later requests.

If the requestor transaction needs to wait for the completion of the transaction identified by the RUR (Step 610) then suspend the requestor's thread of execution at Step 612, return false (Step 697) and loop back to Step 605 for next requested resource, if any.

A pseudo-code representation of the procedure for resource acquisition follows:

```
AcquireRight(requestor, Resources<ofAclass>, intendedUse)
    If resources do not exist, or do not require control, return true
If the intendedUse does not require control, return true
MustWait = false
Find the AccessMethod for the Resource Class
Foreach resource
    NeedAnRUR = true;
    Get the specials: ID, Creator, Deleter
    Foreach usageRecord for the given resource
        Get the ExistingUser
        If the ExistingUser has aborted, continue
        If the ExistingUser is the RequestingUser
            Update usageRecord to include intention
            NeedAnRUR = false;
            Continue
        If (intendedUse must follow existingUse)
            AssertOrder(existUser, intendUser)
        If (intendedUse must precede existingUse)
            AssertOrder(intendUser, existUser)
        If (intendedUse must wait for existingUse)
            AssertOrder(existUser, intendUser)
            MustWait = true
    If (NeedAnRUR)
        insertRURIntoAccessMethod(resourceID, UserID, IntendedUse)
```

-continued

```
If (MustWait)
    Suspend requestor
    Return false
```

It takes valuable time and space to create and check Resource Usage Records (RURs). For read-intensive transactions that are not declared to be read-only, dealing with RURs can mean a significant reduction in performance. One way to reduce this overhead is for a read-intensive transaction to use resources at a larger level of granularity. If a transaction declares its intention to read a whole table of records, then transactions that update records in the table will serialize after the reader, even if the reader never read the specific records modified by the update transactions.

The optional Qualifier field 404 in RUR allows for serialization ordering at an intermediate granularity between individual records and entire tables. If a read operation on a table of financial transactions is only looking for the past week's transactions and a modify operation on the same table is only deleting transactions more than 60 days old, then the corresponding qualifiers are known not to overlap (in the sense that there cannot be any records in the table that match both qualifiers) and no serialization edge is asserted between these two transactions. If the two qualifiers cannot be shown not to overlap (if the first transaction were looking for transactions for a particular account, say, rather than by date) then a serialization edge is asserted just as if the two transactions were reading and modifying the entire table. This approach reduces the overhead associated with tracking operations at the record level without losing all of the concurrency advantages.

Reverse mode resource acquisition is another technique for obtaining the advantages of using resources at larger levels of granularity (less overhead) while preserving some of the concurrency advantages of record-level usage. Typically, when transactions read records in a given table, they first check to see if any active transactions have modified or are waiting to modify records in the table. If there are no actual or potential updaters, then the readers operate at the granularity of the table, otherwise they acquire RURs at the level of individual records.

When transactions update records in a table, they first check to see if there are any readers operating at the granularity of the table. If so, the writers either serialize after such readers, or wait for the completion of such readers. In environments with many readers and few writers, this technique avoids the overhead of record-level RURs most of the time.

When two transactions try to update the same record, traditional concurrency control mechanisms view this as a conflict. The general rule is that the second attempt must wait for the completion of the first transaction, or one transaction must be aborted. However, there are well known exceptions to this general rule. A common example is the case of two transactions making concurrent deposits to the same bank account. So long as neither transaction reads the balance before making the deposit, the deposits can occur in either order without affecting serialization or correctness.

The present invention supports the ability of two transactions to concurrently modify the same field of the same record in a special "arithmetic mode". When two or more transactions use a table in arithmetic mode, the system does not establish serialization orderings between those transactions when they update records in the table. This supports the ability to rollback the changes made in arithmetic mode by computing an UNDO operation after every change. This UNDO operation is the logical inverse of the operation made. For example, if a transaction changed a data item in arithmetic mode by applying an "add 100" operation to its then-present-value, then it would also record a "subtract 100" UNDO operation, to be executed if and only if the transaction aborts. Similarly if a transaction changed a data item in arithmetic mode by multiplying its then-present-value by 100, then it would also record a "divide by 100" UNDO operation.

One embodiment of the present invention places a restriction on arithmetic mode usage. For a given field, all transactions updating that field in arithmetic mode are limited to performing either (a) additions and/or subtractions, or (b) multiplications and/or divisions by a non-zero qualtity. Attempts to update a field in arithmetic mode in a way that would violate this restriction are denied.

Figure 8:
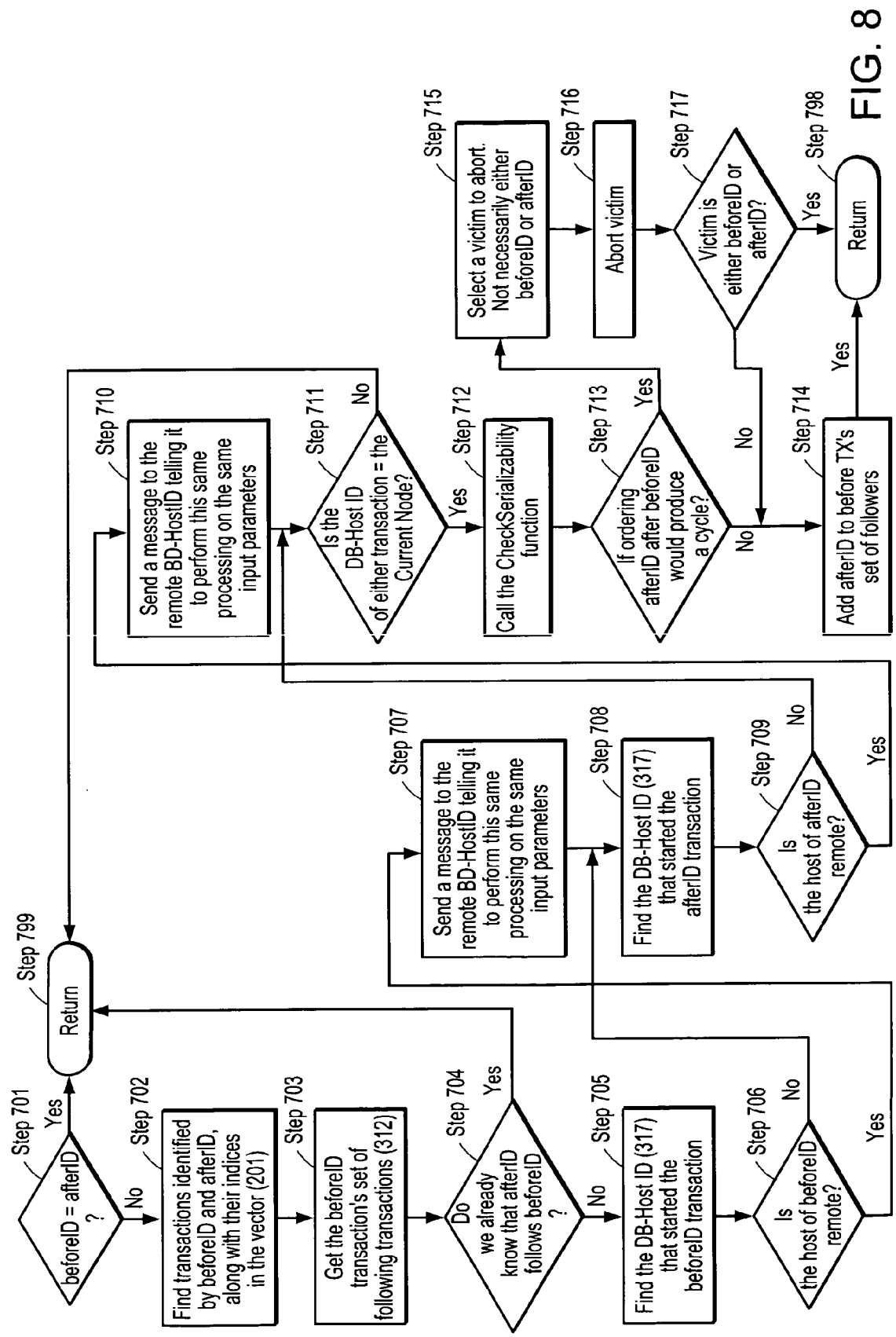
FIG. 8 is a flow chart of a procedure for establishing serial orderings.

FIG. 8 is a flow chart of a procedure for establishing serial orderings. The AssertOrder procedure is used to establish arcs in a serialization graph, and to trigger serialization cycle detection. The procedure takes two transaction ID inputs, beforeID and afterID, and tries to assert that transaction beforeID serializes before transaction afterID. It operates locally first, and then communicates with other hosts on a "need to know" basis.

The first Step 701 is a quick test to ensure that beforeID and afterID are different. It does not make sense to assert that a transaction comes before itself. In the next step, Step 702, the local TxMgr 103 locates the beforeID and afterID transactions by iterating over its vector of transactions 201, from the oldest transaction 203 to the newest transaction 205, and noting the index of the transactions 300 whose TIDs 301 equal beforeID and afterID. After locating the beforeID transaction, in the next Step 703 the local TxMgr 103 retrieves its bit vector of following transactions 312. At Step 704, the TxMgr 103 checks to see if the afterID transaction appears as a direct follower of the beforeID transaction. This check is performed by finding the index of the afterID transaction within the TxMgr's 103 vector of transactions 201 and then testing the bit with this same index in the beforeID transaction's bit vector of followers. If afterID is already a direct follower of beforeID, no additional work is necessary.

If afterID was not already a direct follower of beforeID, then the Step 705 identifies the DB-Host ID 317 of the nodes that started the beforeID transaction. If this differs from the ID of the host on which this procedure is executed, the local TxMgr 103 communicates with the host 317 that started the beforeID transaction, instructing it to run this procedure to establish a serial ordering between beforeID and afterID (Steps 706, 707). The next step 708 identifies the DB-Host ID 317 of the node that started the afterID transaction. If this differs from the ID of the host on which this procedure is executed, the local TxMgr 103 communicates with the host 100 identified by DB-Host ID 317 that started the afterID transaction, instructing it to run this procedure to establish a serial ordering between beforeID and afterID (Steps 709, 710). The communication in Steps 707 and 710 are packaged as an AssertOrder message listing both beforeID and afterID, and is delivered asynchronously to the relevant hosts. The local TxMgr 103 does not wait for a response from either host 100. It proceeds on the optimistic basis that no global serialization cycle will be found. If it is wrong in this assumption, a host 100 will later abort one or more transactions to resolve the cycle.

In one preferred embodiment the communication (Steps 707 and 710) between the local TxMgr 103 and the host(s) 317 that started the beforeID and afterID transactions is skipped. When computing environments are well ordered and highly predictable, a database administrator may know that a given mix of applications cannot possibly form a serialization cycle. In such cases, cycle detection is unnecessary, and communication between local nodes and hosts for the purpose of cycle detection can therefore be skipped.

After the local host has communicated new serialization ordering information to remote hosts on a need-to-know basis, the next step is to integrate the new ordering information into the local graph. At Step 711, if the node executing this procedure started the beforeID or afterID transactions, it must first check serializability, by calling the CheckSerializationCycles procedure at Step 712 (described below). If this procedure finds a cycle (Step 713), it also supplies a list of potential victims, such that aborting one or more of these victims should help eliminate the cycle. In the case that a cycle was found, the TxMgr 103 selects a victim at Step 715 from the list of candidate victims and aborts the victim at Step 716. A victim can be selected based on priority, desired completion time (if any), and age. Transactions can be assigned a priority class. Given a choice, the lowest priority victims are chosen. Within a priority class, the victims whose desired completion time (if any) is furthest away are chosen. All other things being equal, the victims that have been started most recently are chosen.

If there is no cycle or if there is a cycle, but the selected victim is neither the beforeID nor the afterID (Step 717), then the afterID is explicitly listed as a follower of the beforeID transaction (Step 714).

The pseudo-code for establishing serial orderings follows:

```
Local Detection of Orderings by Reference to Resource Usage Records
    Local Record of Ordering
        If beforeID == afterID, ignore
        Find the BeforeUser based on ID
        Get BeforeUser's set of following Ids
    Communication of Serialization Arcs to Hosts
        If either end of the new ordering is non-local
            Inform the host of the non-local user of the ordering
    Integration of Arcs into Host's Graph
        If (CheckSerializability fails)
            Select Victim (not necessarily member of arc)
            Abort Victim
            If (Victim not either member of arc)
                Add afterID to beforeTX's set of followers
        Else
            Add afterID to beforeTX's set of followers
```

Figure 9:
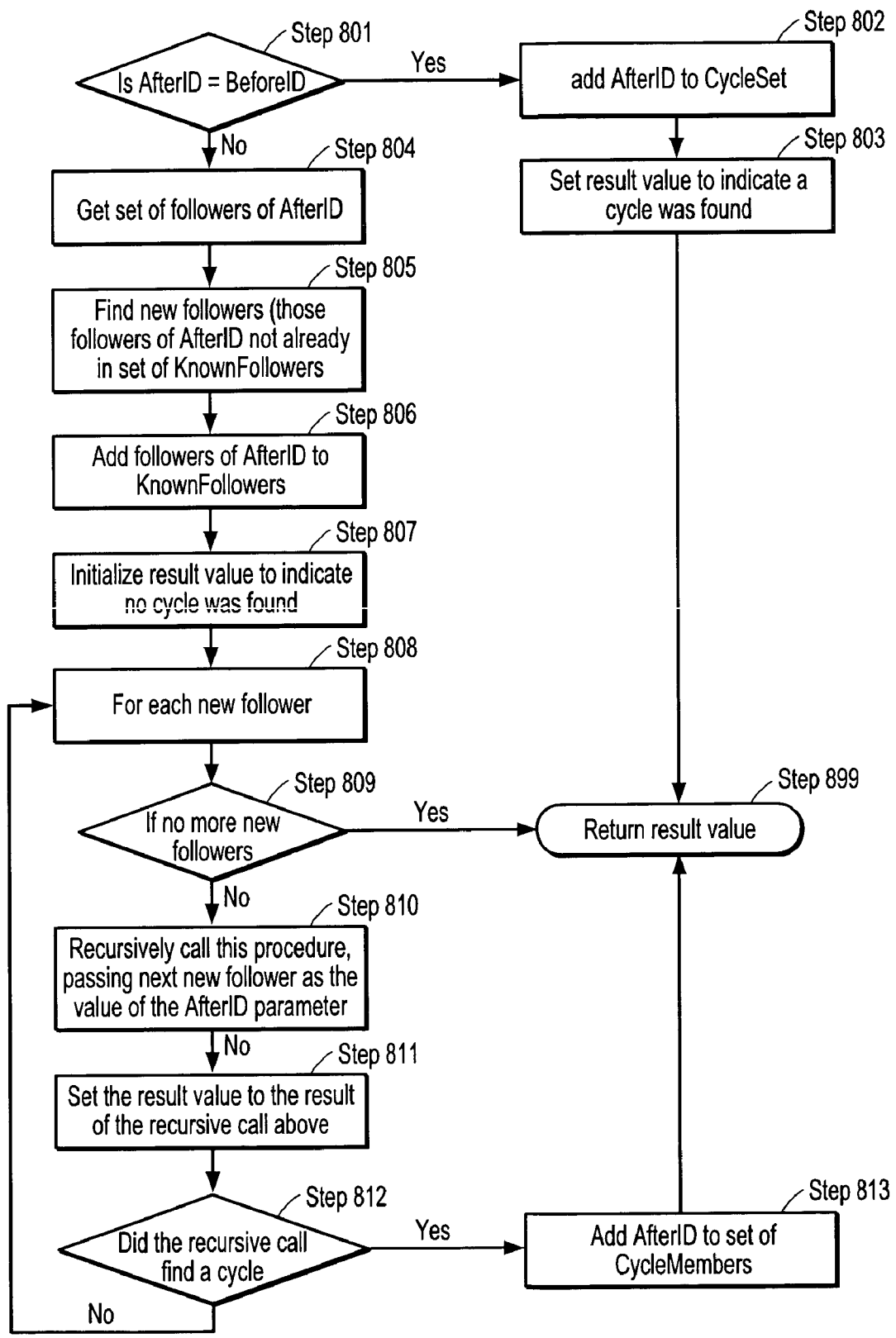
FIG. 9 is a flow chart of a procedure for serialization cycle detection.

FIG. 9 is a flow chart of a recursive procedure for serialization cycle detection (the CheckSerializability function). The procedure takes two inputs and two parameters that are both inputs and outputs. The inputs are the TIDs of two transactions, such that the first is supposed to serialize before the second. If the algorithm determines that the second already serializes before the first, then the check will fail. Each time the procedure is called recursively, the beforeID stays the same but the afterID changes. The third parameter is a set of all transactions known to follow directly or indirectly the transaction identified by the original afterID. It is initially an empty set, and accumulates the followers of the original afterID with each level of recursion. The last parameter is initially an empty set. If a cycle is detected, it holds the identifiers of all transactions that participate in the cycle. The system will use that information to select a victim to abort in order to break the cycle and restore linear serializability.

At Step 801 the two TIDs are compared. If the afterID is the same as the beforeID, then a cycle has occurred; the procedure adds the afterID to the cycleSet at Step 802 and sets the result to a value indicating that a cycle occurred (Step 803), and returns the result at Step 899. If the beforeTID and afterTID differ, Step 804 finds the transaction 300 whose TID field 301 contains the value for the afterID, and retrieves the set of its followers 312. Step 805 finds the new followers by subtracting the knownSetOfFollowers (compute bitwise NOT of knownFollowers, and bitwise AND the result with set of followers of afterID). Step 806 adds the set of followers of afterID to the set of Known Followers (compute bitwise OR). At Step 807 the procedure loops through the set of new followers produced as a result of Step 805. For each new follower (Steps 808, 809), the procedure recursively calls itself (Step 810), passing the new follower as the new value for afterID (Step 811). If the result of the recursive call is that a cycle was detected (Step 812), then the procedure adds afterID to cycleMembers at Step 813 and returns an indicator that a cycle was found. Otherwise, the procedure loops back to Step 808 to check for the next new follower. If, after considering every new follower (if any), no serialization cycles have been found, then the procedure returns at Step 899.

The pseudocode for checking for serialization cycles follows:

```
CheckSerializationCycles(beforeID, afterID, knownSetOfFollowers,
        SetOfCycleMembers)
    If AfterID = beforeID
    add afterID to cycleSet
    return value indicating cycle occurred
    Get set of followers of afterTID
    Find new followers (followers & ~knownFollowers)
    Add followers of afterID to set of Known Followers
    Foreach new follower
        Recursively check serializability (new Follower is new AfterID)
        If cycle, add afterID to cycle members
```

Figure 10:
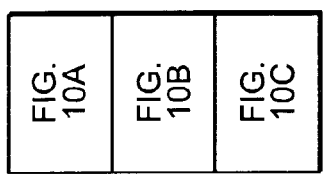
FIG. 10 (consisting of FIGS. 10A–10C, hereinafter "FIG. 10" generally) is an activity sequence diagram showing communications between distributed database components during serialization cycle detection with a single host.
Figure 10A:
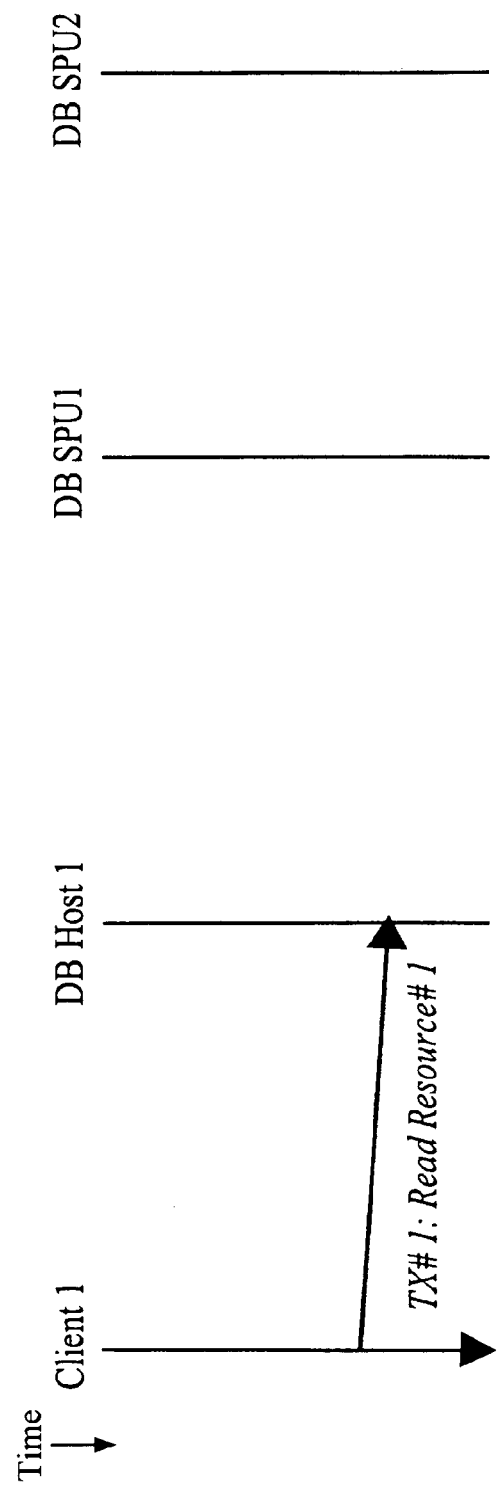
Figure 10B:
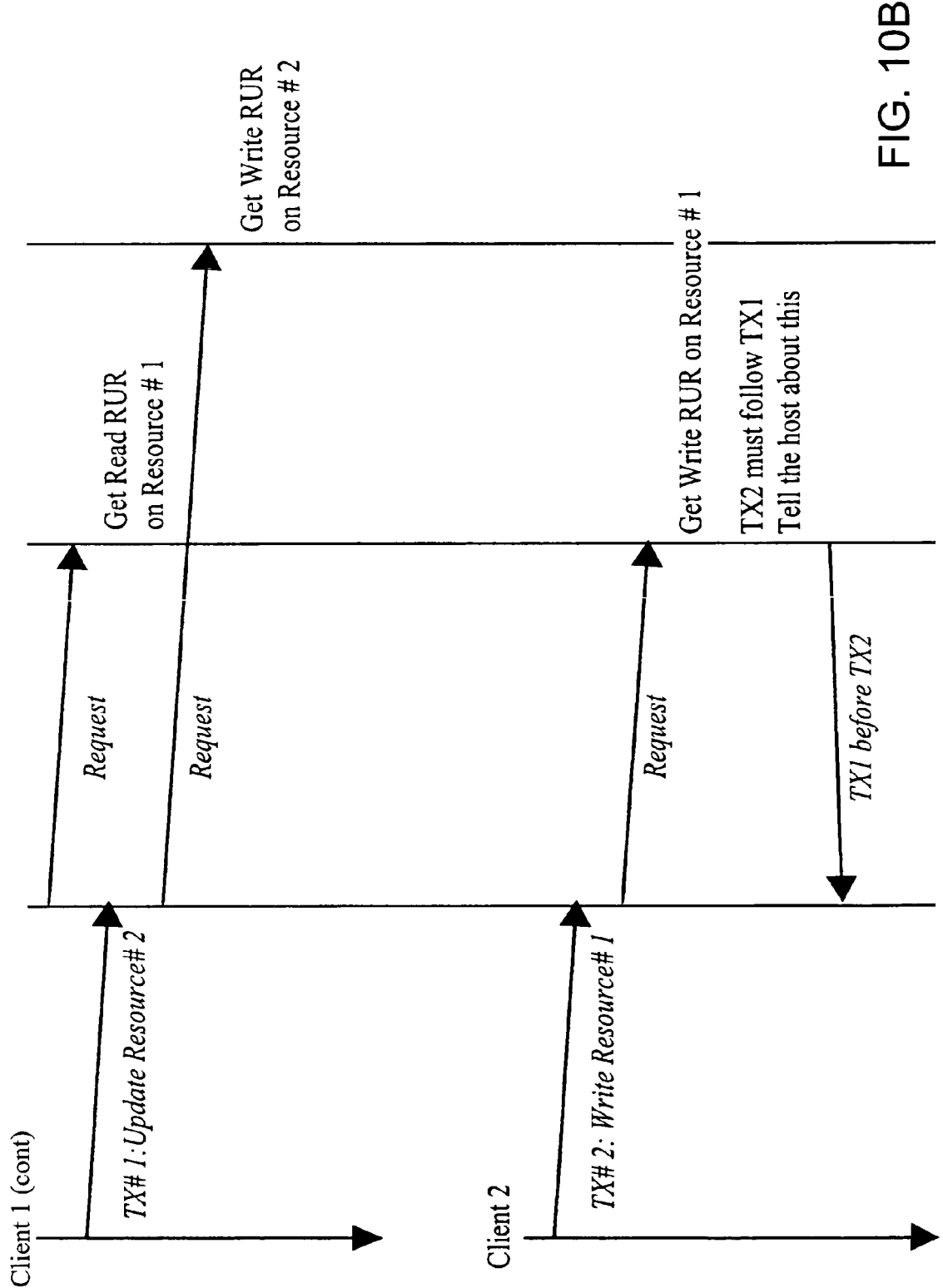
Figure 10C:
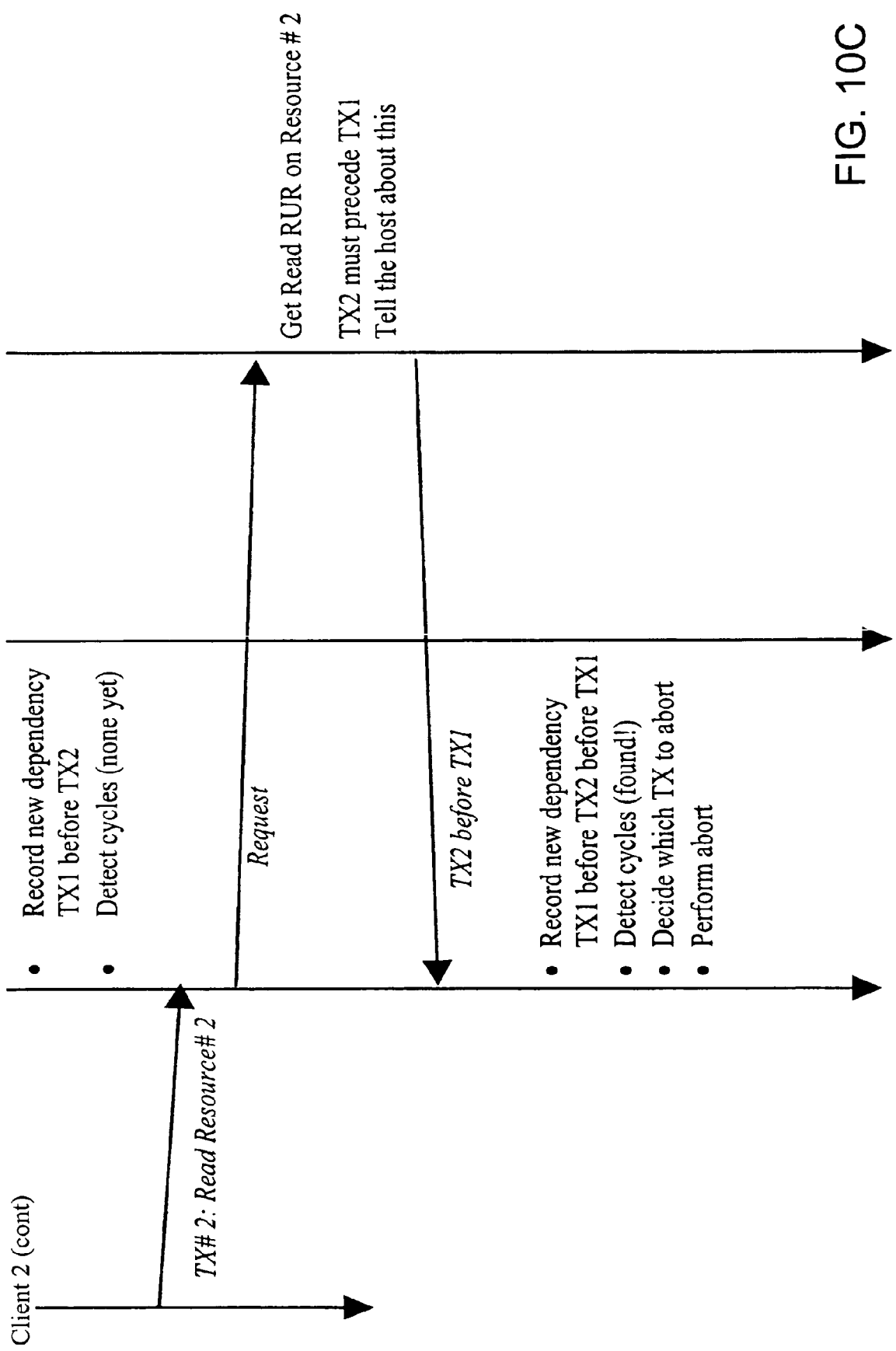
Figure 11:
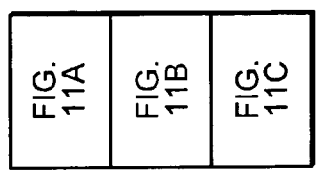
FIG. 11 (consisting of FIGS. 11A–11C, hereinafter "FIG. 11" generally) is an activity sequence diagram showing communication between distributed database components during serialization cycle detection with two hosts.
Figure 11A:
Figure 11B:
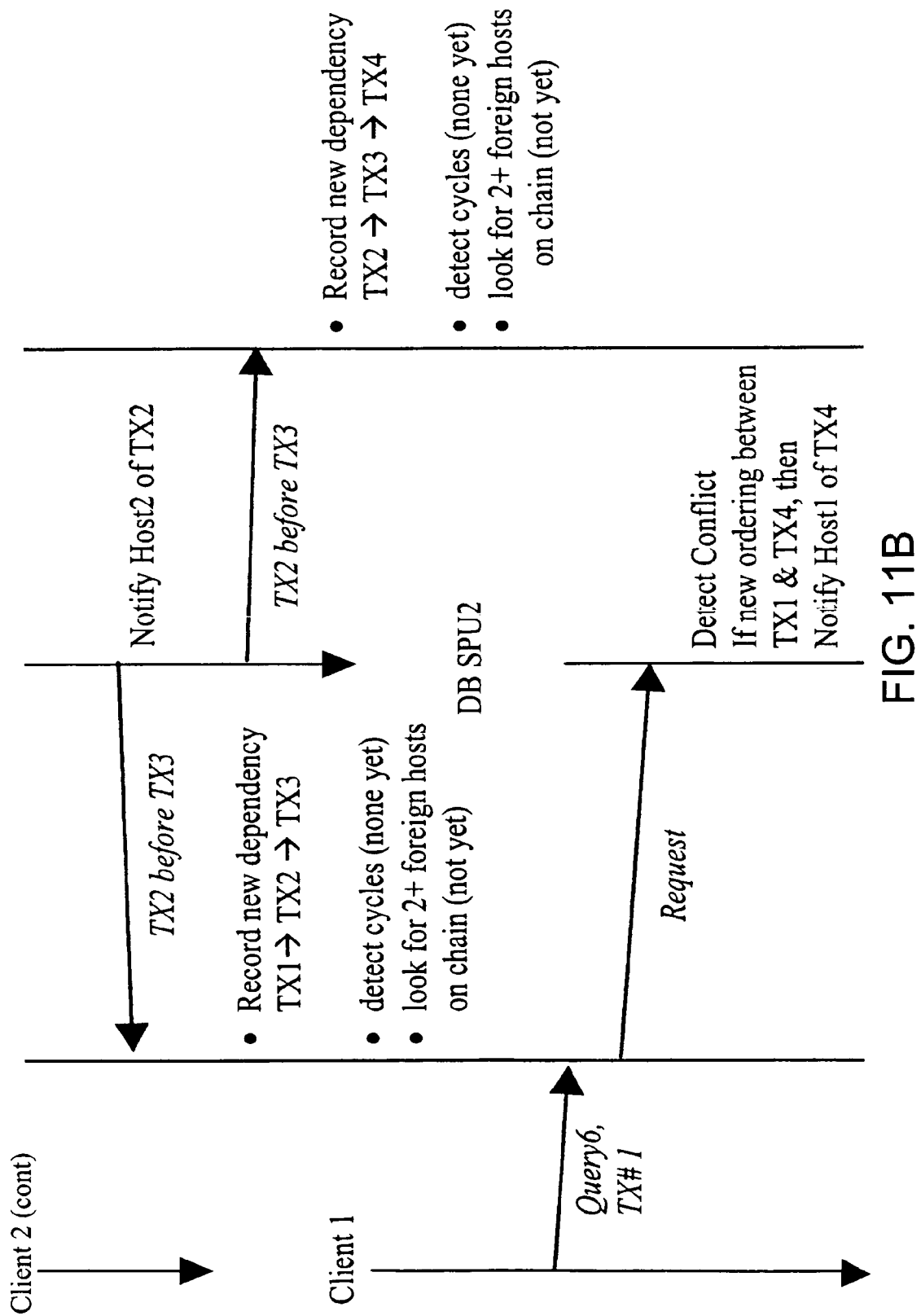
Figure 11C:
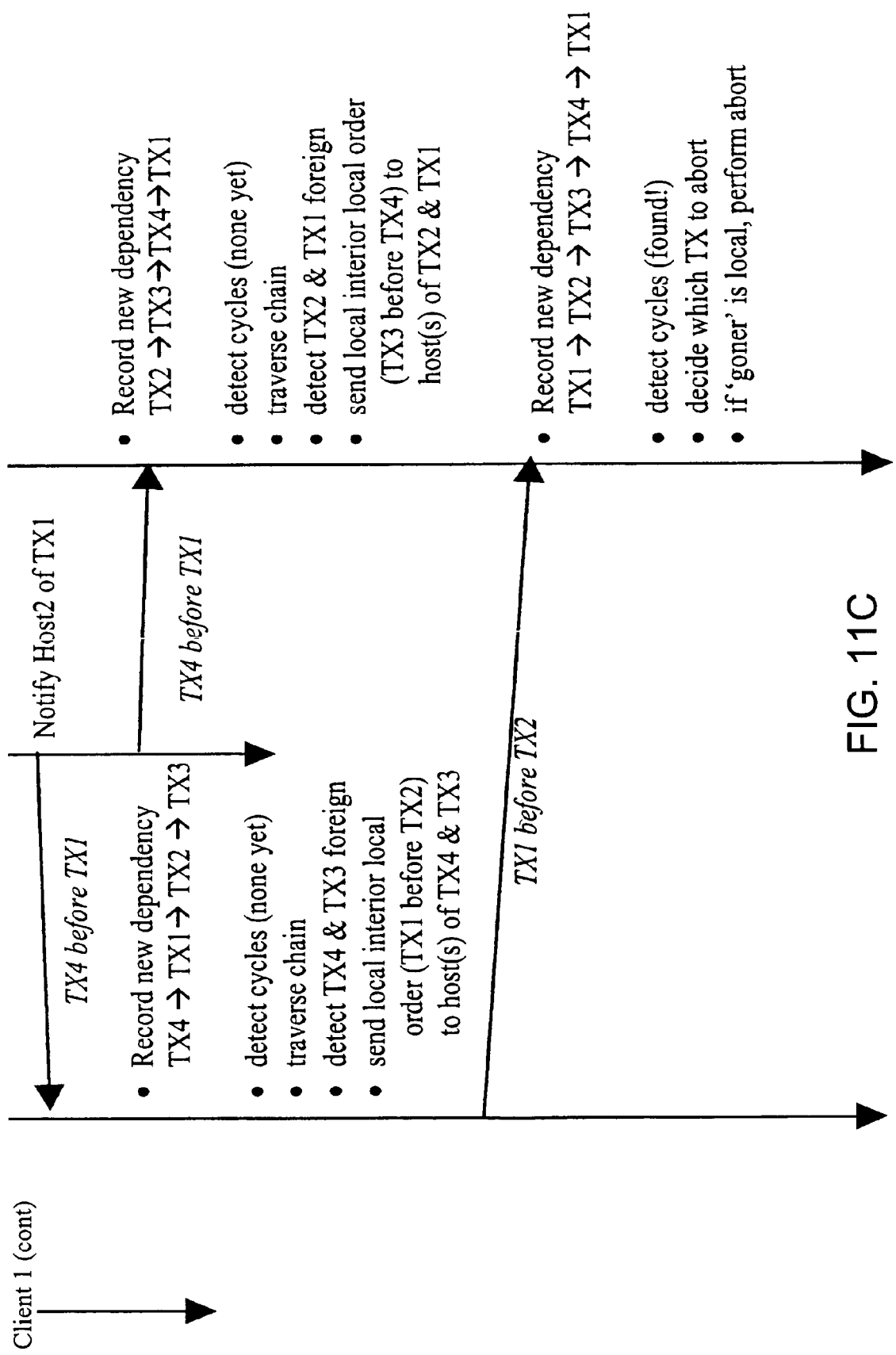
Figure 12B:
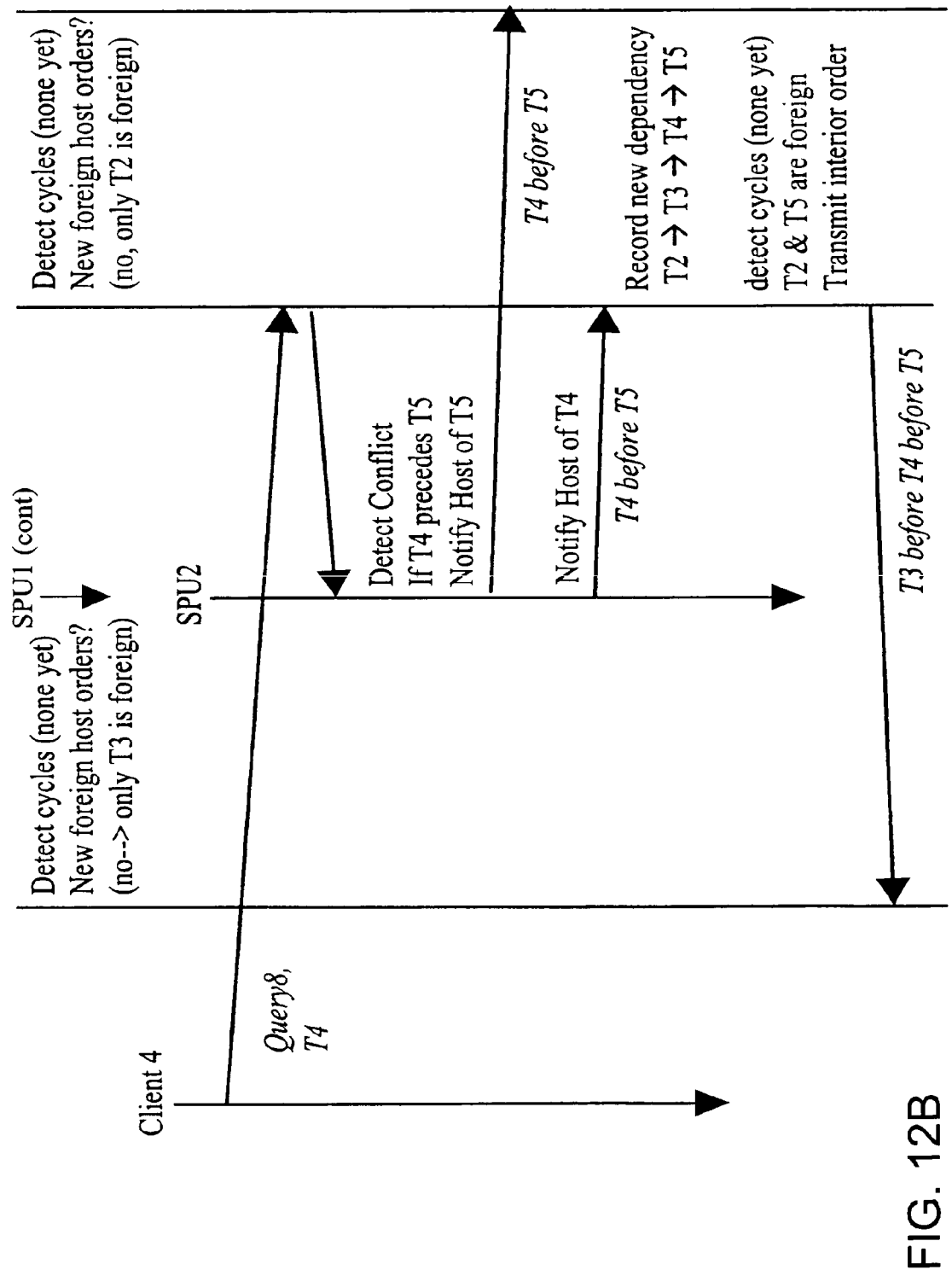
FIG. 12 (consisting of FIGS. 12A–12C. hereinafter "FIG. 12" generally) is an activity sequence diagram showing communication between distributed database components during serialization cycle detection with three hosts.
Figure 12C:
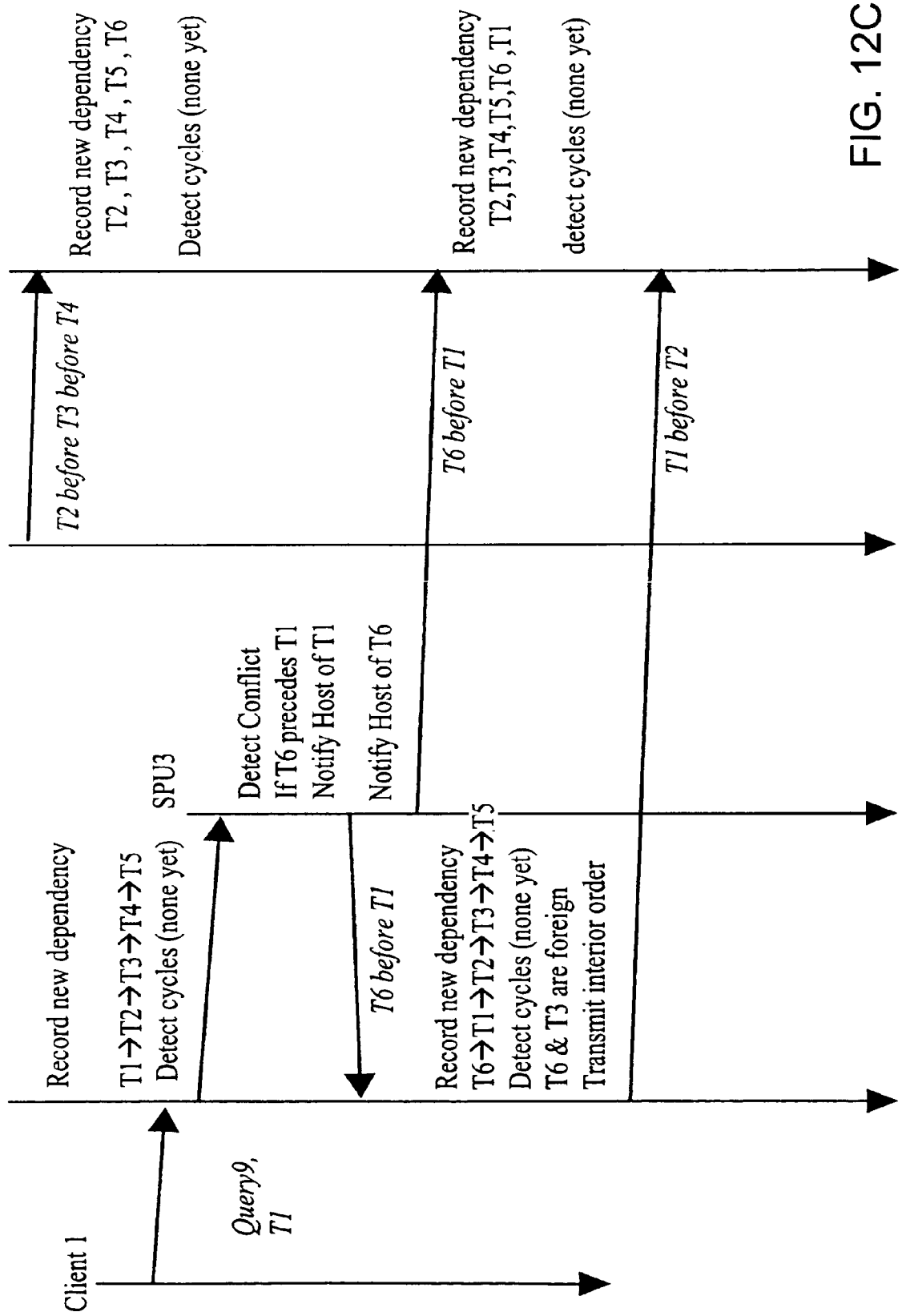

FIGS. 10, 11, and 12 are illustrative examples of how a preferred embodiment of the present invention checks for serialization cycles in the case of one, two, or three (or more) hosts respectively. The diagrams show the relationship of the procedures for acquiring resource usage records, establishing serial orderings and checking for serialization cycles. The figures illustrate message passing between DB-Hosts and DB-SPUs.

FIG. 10 is an activity sequence diagram showing communications between distributed database components during serialization cycle detection with a single host and several SPUs. A client (Client 1) initiates a database transaction (TX#1) on DB Host1 and requests a read of a resource (Resource #1). The Read Resource #1 request is sent to DB SPU1 which gets a Read RUR on Resource #1. Client 1 then requests an update to a resource (Resource #2) on DB SPU2. The Update Resource #2 request is sent to DB SPU2 which gets a Write RUR on Resource #2.

Client 2 initiates a database transaction (TX#2) on DB Host1 and requests a write on a resource (Resource#1). The Write Resource#1 request is sent to DB SPU1 which gets a Write RUR on Resource#1. At this point it can be determined that TX#2 must follow TX#1 and this information is communicated back to the transaction host (DB Host1) because DB Host1 "needs to know" about the serialization. DB Host 1 records the new dependency (TX#1→TX#2) in its serialization graph and checks for cycles. No cycles are detected.

Client 2 then requests a read on Resource#2. The Read Resource#2 request is sent to DB SPU2 which gets a Read RUR on Resource #2. This causes an assertion that TX#2 must follow TX#1 and this information is communicated back to the transaction host (DB Host1).

DB Host 1 records the new dependency, which results in a serialization order of TX#1 before TX#2 before TX#1 (TX#1→TX#2→TX#1) in the serialization graph. This ordering represents a cycle in the serialization graph and a decision is made to abort one of the transactions. The selected transaction is then aborted. In this way distributed concurrency control using serialization ordering is achieved across several SPUs and a single host.

FIG. 11 is an activity sequence diagram showing communication between distributed database components during serialization cycle detection with two hosts and several SPUs. In this example it is assumed that the serialization graph at DB Host1 contains a TX#1→TX#2 dependency and that the serialization graph at DB Host2 contains a TX#3→TX#4 dependency. A client (Client 2) initiates a query (Query5) in database transaction (TX#2) and makes a read request to DB SPU1. DB SPU1 detects a conflict, asserts a new ordering (TX#2→TX#3) and communicates this information to DB Host1 and DB Host2.

DB Host1 records the new dependency in the serialization graph (TX#1→TX#2→TX#3) and checks for cycles. No cycles currently exist. DB Host1 then checks for two or more foreign hosted transactions. Two or more foreign hosted transactions do not currently exist. DB Host2 records the new dependency in the serialization graph (TX#2→TX#3→TX#4) and checks for cycles. No cycles currently exist. DB Host2 then checks for two or more foreign hosted transactions. Two or more foreign hosted transactions do not currently exist.

Client 1 then initiates a query (Query6) in database transaction (TX#1) and makes a write request to DB SPU2. DB SPU2 detects a conflict, asserts a new ordering (TX#4→TX#1) and communicates this information to DB Host1 and DB Host2.

DB Host1 records the new dependency in the serialization graph (TX#4→TX#1→TX#2→TX#3) and checks for cycles. No cycles currently exist. DB Host1 then traverses the serialization graph and detects TX#3 and TX#4 as transactions initiated by foreign hosts. DB Host1 then sends its local ordering (TX#1→TX#2) to the host(s) of TX#3 and TX#4 (DB Host2). DB Host2 records the new dependency in the serialization graph (TX#2→TX#3→TX#4→TX#1) and checks for cycles. No cycles currently exist. DB Host2 then traverses the serialization graph and detects TX#1 and TX#2 as transactions initiated by foreign hosts. DB Host2 then sends its local ordering (TX#3→TX#4) to the host(s) of TX#1 and TX#2 (DB Host1).

DB Host2 now adds the new dependency from DB Host1 (TX#1→TX#2) to its serialization graph (TX#2→TX#3→TX#4→TX#1) to produce (TX#1→TX#2→TX#3→TX#4→TX#1). A check for cycles is performed and a cycle is now detected. A transaction to be aborted is selected in order to remove the cycle. The victim transaction, if local, is aborted. If the victim transaction is not local, a message may be sent to its host. In this way distributed concurrency control using serialization ordering is achieved across several SPUs and two hosts.

FIG. 12 is an activity sequence diagram showing communication between distributed database components during serialization cycle detection with three hosts and several SPUs. In this example it is assumed that the serialization graph at DB Host1 contains a TX#1→TX#2 dependency, that serialization graph at DB Host2 contains a TX#3→TX#4 dependency, and that the serialization graph at DB Host3 contains a TX#5→TX#6 dependency. A client (Client 2) initiates a query (Query7) in database transaction (TX#2) and makes a read request to DB SPU1. DB SPU1 detects a conflict, asserts a new ordering (TX#2→TX#3) and communicates this information to DB Host1 and DB Host2.

DB Host1 records the new dependency in the serialization graph (TX#1→TX#2→TX#3) and checks for cycles. No cycles currently exist. DB Host1 then checks for two or more foreign host transactions. Since only TX#3 is foreign to DB Host1, two or more foreign hosted transactions do not currently exist. DB Host2 records the new dependency in the serialization graph (TX#2→TX#3→TX#4) and checks for cycles. No cycles currently exist. DB Host2 then checks for two or more foreign host transactions. Since only TX#2 is foreign to DB Host2, two or more foreign hosted transactions do not currently exist.

Client 4 then initiates a query (Query8) in database transaction (TX#4) and makes a read request to DB SPU2. DB SPU2 detects a conflict, asserts a new ordering (TX#4→TX#5) and communicates this information to DB Host2 and DB Host3.

DB Host2 records the new dependency in the serialization graph (TX#2→TX#3→TX#4→TX#5) and checks for cycles. No cycles currently exist. DB Host2 then traverses the serialization graph and detects TX#2 and TX#5 as transactions initiated by foreign hosts. DB Host2 then sends its local ordering (TX#3→TX#4→TX#5) to the host(s) of TX#1 (DB Host1) and TX#5 (DB Host3). DB Host3 records the new dependency in the serialization graph (TX#2→TX#3→TX#4→TX#5→TX#6) and checks for cycles. No cycles currently exist.

DB Host1 now adds the new dependency from DB Host2 (TX#3→TX#4→TX#5) to its serialization graph to produce (TX#1→TX#2→TX#3→TX#4→TX#5). A check for cycles is performed and a cycle is not detected.

Client 1 then initiates a query (Query9) in database transaction (TX#1) and makes a write request to DB SPU3. DB SPU3 detects a conflict, asserts a new ordering (TX#6→TX#1) and communicates this information to the host of TX#1 (DB Host1) and the host of TX#6 (DB Host3). DB Host1 records the new dependency in the serialization graph (TX#6→TX#1→TX#2→TX#3→TX#4→TX#5) and checks for cycles. No cycles currently exist. DB Host3 records the new dependency in the serialization graph (TX#2→TX#3→TX#4→TX#5→TX#6→TX#1) and cycles. No cycles currently exist. DB Host1 checks for two or more foreign host transactions and detects TX#6 and TX#3 as foreign hosted transactions. DB Host1 transmits its local serialization order (TX#1→TX#2) to DB Host3. In this way distributed concurrency control using serialization ordering is achieved across several SPUs and three hosts.

Figure 13:
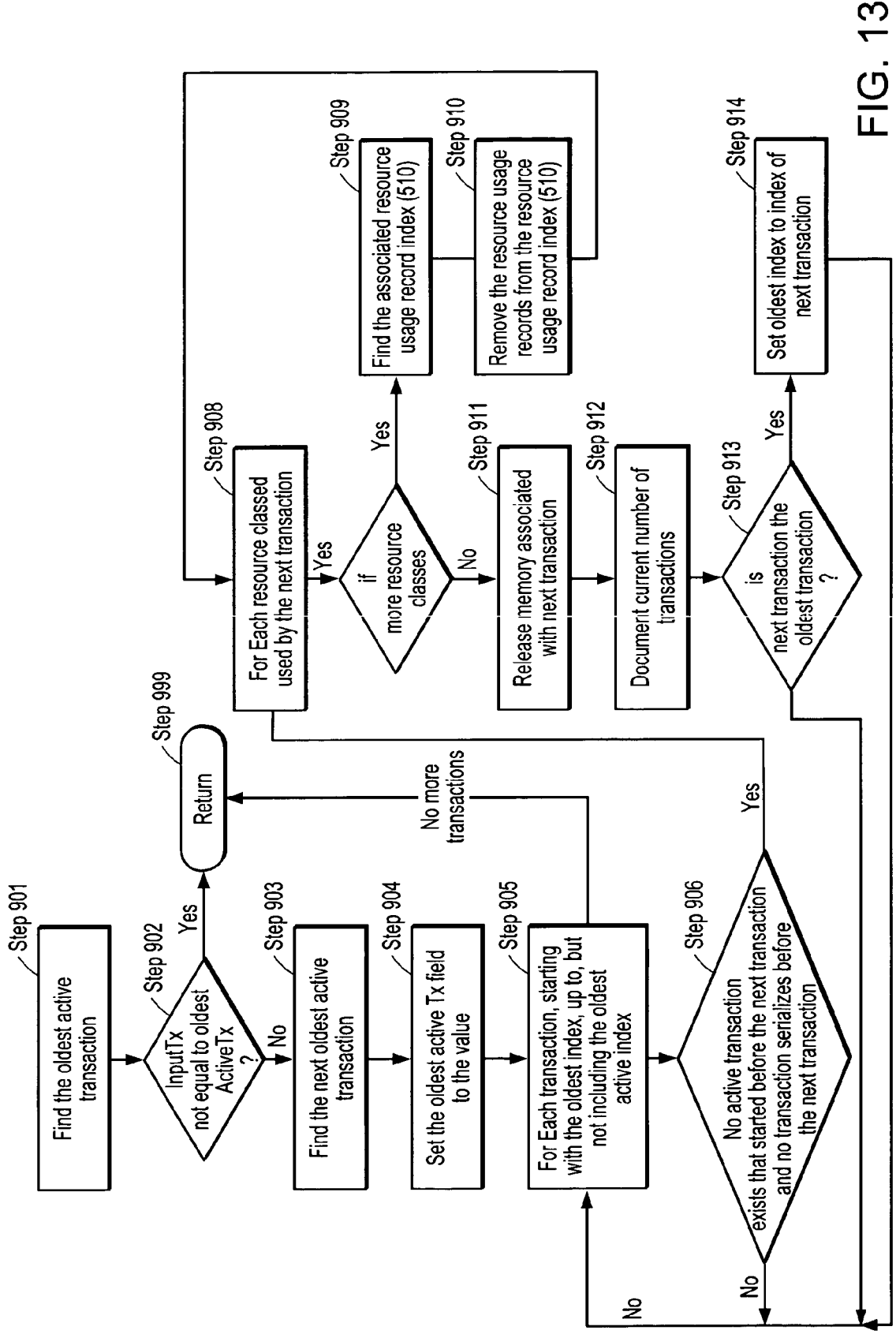
FIG. 13 is a flow chart of a procedure for releasing Resource Usage Records.

FIG. 13 is a flow chart of a procedure for releasing Resource Usage Records. Resources used by a transaction that is rolled back can be released immediately, since that transaction will be removed from the serialization graph as if it never happened. The resources used by a committed transaction can be released when it is certain that no new serialization edges can be created that would lead to a cycle (of serialization edges) involving this transaction. This will be true when there is no other active transaction that started before this transaction committed, and there is no other committed transaction that serializes before this transaction.

A potential opportunity to clear out resources used by committed or aborted transactions therefore arises whenever the "oldest active" transaction commits or aborts.

The procedure takes as input a pointer to a transaction 300 being committed or aborted. Step 901 locates the transaction corresponding to the TxMgr data structure's 200 Oldest Active Transaction field 204. If these are different at Step 902, the procedure returns at Step 999. If these are equal at Step 902, then the process is completing the oldest active transaction. First, the process finds the new "oldest active" transaction at Step 903 and sets oldestActiveIndex to point to this transaction (if there is one, or a special "NONE" value if there are no longer any active transactions) at Step 904. Then, at Step 905, a loop is performed over each transaction 300 on the TxMgr's vector of transactions 201, starting with the oldestIndex 203 up to but not including the (new) oldestActiveIndex 204, calling the next such transaction "nextTX". In Step 906, nextTX is tested to see if there are any active transactions whose Transaction Start Time 307 is earlier than the nextTX's Transaction Start Time 307. If there are such transactions, the nextTX is not cleaned up, and the process loops back to Step 905. If, still at Step 906, some other committed transaction 300 serializes before nextTX, then the next TX is not cleaned up, and the process loops back to Step 905. Otherwise, there are no committed transactions that serialize before nextTX, and there no active transactions that started before nextTX, in which case, we may release the resources associated with nextTX, starting with Steps 908 through 910, in which the process removes the RURs (whose Resource UserID 402 matches the nextTX) from the Resource Usage Record Index 510, and frees the memory associated with any such RURs. Then, at Step 911, the procedure frees the memory associated with nextTX. At Step 912 the Transaction Manager's Current Number of Transactions field (202) is decremented by one. If the index of nextTX was equal to the Transaction Manager's Index of the Oldest Transaction in the Vector (203) field, then reset the value of this index (203) to the index of the next transaction in the vector (Steps 913, 914).

The pseudo-code for releasing resource of a completed transaction follows:

```
ReleaseResources (Transaction being committed or aborted)
    Find the oldest active transaction
    If the oldest active transaction is not the same as the input
        Return without doing anything;
    Find the new oldest active transaction
        Set the oldestActive transaction to the new value
    For each transaction, starting with the oldestIndex, up to but not
    including the oldestActiveIndex
        If there is no active transaction that started before this transaction and
        there is no transaction that serializes before this transaction,
            Cleanup its ResourceUsageRecords by doing the following:
                Foreach Resource Class
                    Find the associated ResourceUsageTree 510
                    Remove the RUR if any of this TX from the Tree
            Release memory associated with the next transaction
            Decrement the currentNumberOfTransactions
            If this is the oldest transaction, set the oldestIndex to the next
            transaction
```

Figure 14:
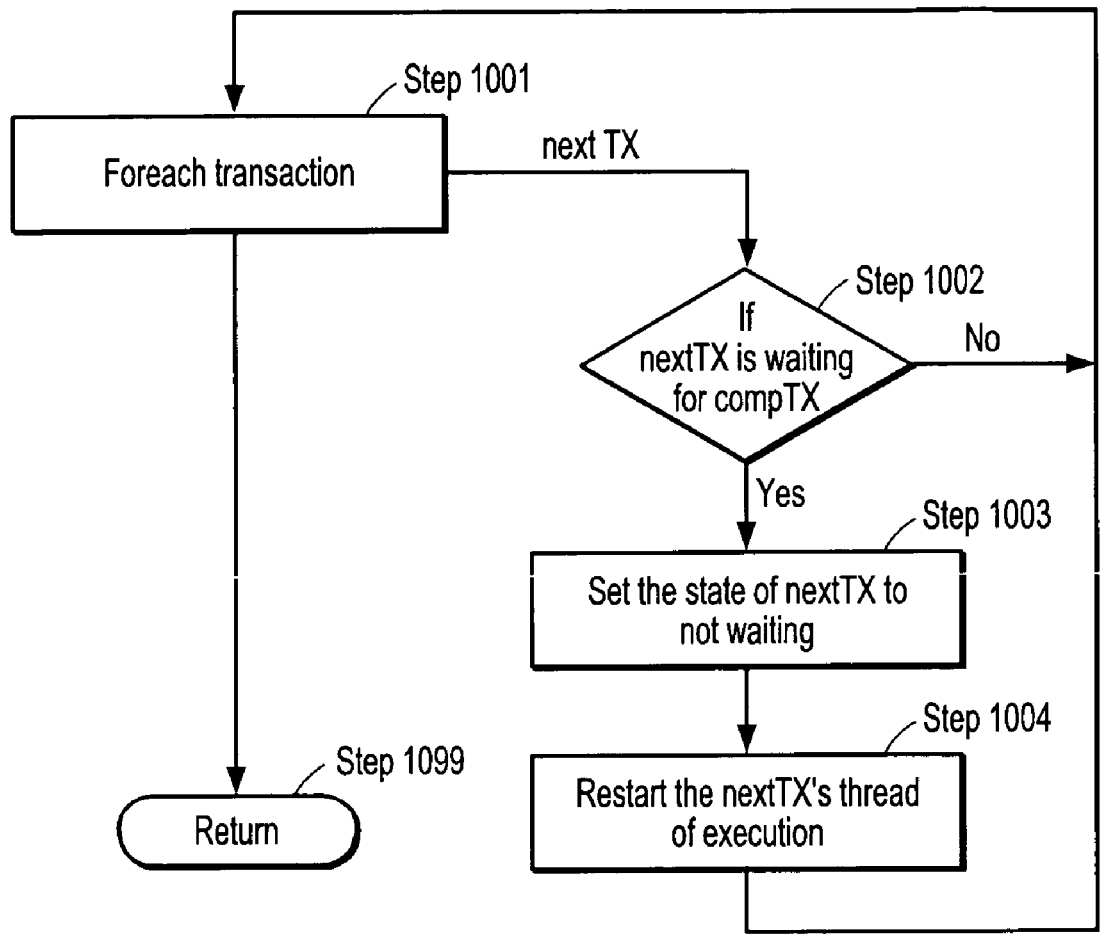
FIG. 14 is a flow chart of a procedure for awakening waiting transactions.

FIG. 14 is a flow chart of a procedure for awakening waiting transactions. When a transaction commits or aborts, the TxMgr (103, 113) uses Transaction Manager data structure 200 to check whether it should awaken any transactions that were waiting for the completed transaction to finish using its resources. The procedure operates by looping over (repeating Steps 1001 through 1004 for) the vector of transactions 201 from oldest, using index 204, to newest using index 205. For each such transaction 300, TxMgr (103, 113) checks to see if it is waiting for the completion of the input transaction (Step 1002). If so, it clears its transaction waiting field 315, and restarts the waiter's query plan 316 (Steps 1003, 1004). After each such transaction has been so processed, the procedure ends (returns) at Step 1099.

The pseudo-code for awakening a waiting transaction follows:

```
Upon Commit/Abort
    Foreach transaction
        If nextTX is waiting for commiter
            Set the state of the TX to not waiting
            Restart the query plan's intended use
```

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of concurrency control for database transactions in a distributed database system comprising two or more nodes on a computer network, said method comprising:
    locally, with respect to a node, dynamically asserting a serialization ordering between a first transaction requesting to use a database resource locally and one or more other database transactions that have already used the database resource locally;
    including the serialization ordering within a local serialization graph, the local serialization graph being local with respect to the node, wherein the local serialization graph comprises a subset of all serialization orderings throughout the distributed database; and
    detecting cycles in a local serialization graph.

2. The method of concurrency control of claim 1, further comprising:
    communicating the serialization ordering from a first node on which it was originally asserted to a second node in the distributed database system, wherein the second node is responsible for ensuring serializability of at least one of the database transactions participating in the serialization ordering.

3. The method of concurrency control of claim 2, wherein a node comprises one or more of a central processor unit, a memory, a storage interface, and a network interface.

4. The method of concurrency control of claim 3, wherein a first subset of nodes have a primary responsibility for managing individual database resources and a second subset of nodes have a primary responsibility for starting and ending database transactions.

5. The method of concurrency control of claim 2, wherein the second node is a master node and is responsible for ensuring serializability of all database transactions in the distributed database system.

6. The method of concurrency control of claim 2, wherein the second node is one of a plurality of nodes collectively responsible for ensuring serializability of all database transactions in the distributed database system.

7. The method of concurrency control of claim 2, wherein a global serialization ordering is maintained across a plurality of nodes.

8. The method of concurrency control of claim 2, wherein the at least one database transaction originated at the second node.

9. The method of concurrency control of claim 2, wherein the second node is selected according to a policy.

10. The method of concurrency control of claim 2, wherein the step of communicating the serialization ordering to the second node further comprises computing new serialization orderings on the second node, and wherein the new serialization orderings arise from logical transitivity between the communicated serialization ordering and serialization orderings present on the second node.

11. The method of concurrency control of claim 10, wherein a subset of the new serialization orderings derived from logical transitivity is communicated to one or more nodes responsible for ensuring serializability of database transactions involved in the new serialization orderings.

12. The method of concurrency control of claim 1, wherein the step of detecting cycles in the serialization graph is performed when a new serialization ordering is discovered.

13. The method of concurrency control of claim 1, wherein the step of detecting cycles in the serialization graph is deferred for a period of time.

14. The method of concurrency control of claim 1, wherein the step of detecting cycles in the serialization graph is performed on the node that establishes a new serialization ordering.

15. The method of concurrency control of claim 1, wherein the step of detecting cycles comprises detecting all cycles in the serialization graph.

16. The method of concurrency control of claim 1, wherein the step of detecting cycles comprises stopping after detecting a first cycle.

17. The method of concurrency control of claim 2, wherein the step of detecting cycles in the serialization graph is performed on the second node.

18. The method of concurrency control of claim 2, further comprising continuing, at the first node, to process requests of database transactions related by the serialization ordering on a cautiously optimistic basis, delegating further global cycle detection to the second node.

19. The method of concurrency control of claim 2, further comprising deferring, at the first node, processing of requests for one or more of the database transactions related by the serialization ordering until the second node warrants that no new cycles are caused by the communicated serialization ordering.

20. The method of concurrency control of claim 1, further comprising:
    breaking a cycle in the local serialization graph by aborting a database transaction whose attempt to use a database resource caused formation of one or more serialization cycles.

21. The method of concurrency control of claim 1, further comprising:
    breaking one or more cycles in the local serialization graph by aborting selected database transactions that are members of one or more serialization cycles, such that after aborting the selected database transactions no serialization cycles remain.

22. The method of concurrency control of claim 1, further comprising:
breaking one or more cycles in the local serialization graph by aborting selected database transactions based on at least one of the following: age, priority, desired time of completion, and other database transaction properties.

23. The method of concurrency control of claim 1, further comprising:
ensuring global serializability by delaying use of the database resource until such time as the use does not result in a cycle of serialization ordering relationships through use of pessimistic 2-phase locking in conjunction with a Read Committed isolation level.

24. The method of concurrency control of claim 23, wherein the step of delaying the use of the database resource further comprises puffing the database transaction requesting the database resource to sleep and awakening the database transaction when the database transaction can use the resource in a way that avoids a serialization cycle.

25. The method of concurrency control of claim 1, wherein the step of asserting a serialization ordering further comprises dynamically asserting the serialization ordering based on pattern of use of the resource by the first database transaction and the one or more database transactions.

26. A method of controlling concurrency of database transactions in a distributed database system comprising two or more nodes, said method comprising:
locally, dynamically asserting, at a local node, a resolution of resource contention between a first database transaction attempting to use a database resource and one or more other database transactions that have already used the database resource;
communicating the resolution of resource contention from the local node to a second node in the distributed database system, wherein the second node is responsible for ensuring serializability of at least one of the database transactions participating in the resource contention, said communicating thus being on a need-to-know basis instead of systemwide; and
locally identifying a database transaction that is causing the resource contention.

27. The method of controlling concurrency of database transactions of claim 26, wherein the step of locally asserting a resolution of resource contention further comprises asserting a serialization ordering.

28. The method of controlling concurrency of database transactions of claim 27, wherein the step of communicating the resolution of resource contention further comprises communicating a subset of arcs from a local serialization graph.

29. The method of controlling concurrency of database transactions of claim 27, further comprising including the serialization ordering within a local serialization graph, wherein the local serialization graph comprises a subset of all serialization orderings in the distributed database.

30. The method of controlling concurrency of database transactions of claim 29, further comprising detecting cycles in the local serialization graph.

31. The method of controlling concurrency of database transactions of claim 26, wherein the second node is a master node.

32. The method of controlling concurrency of database transactions of claim 26, wherein the second node is one of a plurality of nodes collectively responsible for ensuring global serialization ordering.

33. The method of controlling concurrency of database transactions of claim 26, wherein the second node is selected based on a policy.

34. The method of controlling concurrency of database transactions of claim 26, wherein at least one of the first database transaction and the one or more database transactions originated at the second node.

* * * * *